(12) United States Patent
Khanna et al.

(10) Patent No.: US 8,836,306 B2
(45) Date of Patent: Sep. 16, 2014

(54) MULTI-PHASE POWER SYSTEM WITH REDUNDANCY

(75) Inventors: Sandeep Khanna, Los Altos, CA (US); Maheshwaran Srinivasan, Santa Clara, CA (US); De Cai Li, Fremont, CA (US); Chetan Deshpande, San Jose, CA (US)

(73) Assignee: NetLogic Microsystems, Inc., Irvine, CA (US)

( * ) Notice: Subject to any disclaimer, the term of this patent is extended or adjusted under 35 U.S.C. 154(b) by 0 days.

(21) Appl. No.: 13/618,652

(22) Filed: Sep. 14, 2012

(65) Prior Publication Data
US 2013/0009619 A1 Jan. 10, 2013

Related U.S. Application Data

(62) Division of application No. 12/028,774, filed on Feb. 8, 2008, now Pat. No. 8,274,265.

(60) Provisional application No. 60/892,222, filed on Feb. 28, 2007.

(51) Int. Cl.
*H02M 3/157* (2006.01)
*H02M 3/158* (2006.01)

(52) U.S. Cl.
USPC .......................................... 323/283; 323/272

(58) Field of Classification Search
USPC .................. 323/277, 282, 283, 284, 285, 286
See application file for complete search history.

(56) References Cited

U.S. PATENT DOCUMENTS

| | | | |
|---|---|---|---|
| 3,586,930 A | 6/1971 | Das et al. | |
| 3,914,689 A * | 10/1975 | Wright | 324/119 |
| 4,734,844 A | 3/1988 | Rhoads | |
| 4,837,495 A * | 6/1989 | Zansky | 323/222 |
| 5,193,054 A | 3/1993 | Galloway et al. | |
| 5,682,054 A | 10/1997 | Nakashima | |
| 5,708,619 A | 1/1998 | Gillingham | |
| 5,770,504 A | 6/1998 | Brown et al. | |
| 5,955,872 A | 9/1999 | Grimm | |
| 5,973,485 A | 10/1999 | Kates et al. | |
| 6,268,716 B1 | 7/2001 | Burstein et al. | |
| 6,316,925 B1 * | 11/2001 | Canter | 323/282 |
| 6,366,155 B1 | 4/2002 | Moon et al. | |
| 6,429,633 B1 | 8/2002 | Kajiwara et al. | |
| 6,448,746 B1 | 9/2002 | Carlson | |
| 6,563,294 B2 | 5/2003 | Duffy et al. | |
| 6,683,800 B2 * | 1/2004 | Loef et al. | 363/49 |
| 6,707,285 B2 | 3/2004 | Telefus et al. | |
| 6,831,449 B2 * | 12/2004 | Nishida et al. | 323/284 |

(Continued)

OTHER PUBLICATIONS

Leroux et al., "Building in Reliability With Latch-Up, ESD and Hot Carrier Effects On A 0.25 uM CMOS Technology," Proceedings of the 27th European Solid-State Device Research Conference, Sep. 22-24, 1997, pp. 464-467.

*Primary Examiner* — Gary L Laxton
(74) *Attorney, Agent, or Firm* — Sterne, Kessler, Goldstein & Fox PLLC

(57) ABSTRACT

An integrated circuit device for delivering power to a load includes a controller circuit, a cascade circuit, and a power delivery circuit. The controller circuit generates a plurality of control signals. The cascade circuit receives the control signals from the controller circuit and sequentially outputs the control signals onto a cascade bus. The power delivery circuit receives the control signals from the controller circuit and delivers an amount of current to the load, in response to one of the control signals.

32 Claims, 25 Drawing Sheets

(56) References Cited

U.S. PATENT DOCUMENTS

| | | | |
|---|---|---|---|
| 6,836,100 B2 | 12/2004 | Egan et al. | |
| 7,075,278 B2* | 7/2006 | Uematsu et al. | 323/282 |
| 7,132,818 B2* | 11/2006 | Matsuura | 323/222 |
| 7,141,956 B2* | 11/2006 | Chapuis | 323/283 |
| 7,148,665 B2 | 12/2006 | Agari et al. | |
| 7,173,393 B2* | 2/2007 | Maeda et al. | 318/400.02 |
| 7,391,200 B1 | 6/2008 | Khanna et al. | |
| 7,425,819 B2* | 9/2008 | Isobe | 323/222 |
| 7,471,537 B1 | 12/2008 | Park | |
| 7,479,772 B2 | 1/2009 | Zane et al. | |
| 7,692,941 B2 | 4/2010 | Chu et al. | |
| 8,274,265 B1 | 9/2012 | Khanna et al. | |
| 2002/0053658 A1 | 5/2002 | Okamoto et al. | |
| 2003/0080355 A1 | 5/2003 | Shirai et al. | |
| 2004/0208029 A1 | 10/2004 | Caruthers et al. | |
| 2006/0022657 A1* | 2/2006 | Sutardja et al. | 323/283 |
| 2006/0202669 A1* | 9/2006 | Nishimori | 323/283 |
| 2006/0205168 A1 | 9/2006 | Zuniga et al. | |
| 2007/0030061 A1 | 2/2007 | Cho et al. | |
| 2013/0009479 A1 | 1/2013 | Khanna et al. | |

* cited by examiner

MULTI-PHASE POWER SYSTEM WITH REDUNDANCY

CROSS REFERENCE TO RELATED APPLICATIONS

This application is a divisional of U.S. patent application Ser. No. 12/028,774, filed Feb. 8, 2008, which issue as U.S. Pat. No. 8,274,265 on Sep. 25, 2012, which claims benefit to U.S. Provisional Application No. 60/892,222, filed Feb. 28, 2007, all of which are hereby incorporated herein by reference in its entirety.

TECHNICAL FIELD

The present invention relates to power-delivery integrated circuit devices.

BACKGROUND

Power delivery in modern integrated circuit (IC) systems has become increasingly complex as supply voltages fall and power demands become more variant. A number of modern microprocessor systems, for example, require load voltage to be dynamically adjusted in response to processing demand, with voltage overshoot/undershoot to be maintained within closely specified ranges as load voltages change. IC-based power regulation and delivery systems have been developed to meet these requirements.

FIG. 1 illustrates a prior-art IC-based power delivery system 100 that includes a controller IC 101 and multiple power-stage ICs $103_1$-$103_N$. The controller IC 101 outputs respective pulse-width-modulated (PWM) control signals 108 (Pctrl1-PctrlN), shown for example in FIG. 2, to the power-stage ICs $103_1$-$103_N$ which respond by delivering respective currents to a load 119, each at a time and for a duration determined by the duty cycle of the corresponding PWM control signal. As shown in FIG. 2, each PWM control signal includes a pulse 122 per switching interval ($T_{SWITCH}$), with the individual pulses $122_1$-$122_N$ delivered to each power-stage IC $103_1$-$103_N$ being phase staggered so that the power-stage ICs 103 deliver load current at different times. By this arrangement, power delivery systems may be constructed using as many power-stage ICs as necessary to meet the peak power requirements of a given application. Also, the controller may modify the duty cycle of the PWM control signals to dynamically increase/decrease power delivered to the load and thus respond to fluctuating power demand.

As shown in the detail view of power-stage IC $103_1$, each IC 103 includes an N-MOS (N-channel metal oxide semiconductor) power transistor 105, N-MOS bypass transistor 107 and an N-MOS gate driver circuit 109. The gate driver circuit 109 outputs an active-high drive-enable signal 110 ($N_{DRV}$) to switch the N-MOS power transistor 105 to a conducting state, and thereby switchably couple power source, V$^+$ (e.g., a 12-volt source), to a power output node 114 ($V_{OUT}$) of the power-stage IC. The power output node 114 is coupled via inductor 115 ($L_F$) to a variable-resistance load 119 (modeled by resistor $R_L$), which is coupled between inductor 115 and a grounded return node 116 (Ret) of the power-stage IC. Filter capacitor 117 ($C_F$) is coupled in parallel with the load 119 and, together with inductor 115, forms a lowpass filter for maintaining a relatively steady-state supply voltage ($V_{LOAD}$ 120) across load 119. In an embodiment, $C_F$ comprises a plurality of capacitors coupled in parallel.

Referring to FIGS. 1 and 3, the gate driver circuit 109 maintains the active-high drive-enable signal 110 ($N_{DRV}$) for the duration of the control pulse $122_1$ conveyed in the PWM control signal 108 (the pulses $122_1$-$122_4$ for an exemplary set of four power stage ICs are shown collectively in FIG. 3, with the pulses for ICs $122_2$-$122_N$ shown in dashed outline) so that the amount of current delivered to the load 119 by each power-stage IC 103 is proportional to the duty cycle of the corresponding PWM control signal, Pctrl1-PctrlN (i.e., wider control pulse width yields more current to the load 119 per switching interval). As shown, the output voltage 114 quickly rises to the V$^+$ level when the drive-enable signal 110 is raised. At the falling edge of the control pulse $122_1$, the drive-enable signal 110 is deasserted (thus concluding drive-enable pulse 126), switching off the N-MOS power transistor 105 and thus concluding the power-delivery interval for power stage $103_1$. Consequently, the current through inductor 115 begins to fall, resulting in a slightly negative voltage spike 132 (<0v) during the dead time interval 130 between deassertion of the drive-enable signal 110 and assertion of the bypass signal 112 ($N_{BYP}$). When the bypass signal 112 is asserted, bypass transistor 107 begins conducting to provide a shunt path for the inductor current, thus restoring the output voltage 114 to a level at or near the ground potential. The bypass transistor 107 is switched off (i.e., by deassertion of bypass signal 112, thus concluding bypass pulse 128) prior to assertion of the drive-enable signal 110 in the subsequent switching interval. During the bypass interval within power stage $103_1$ (i.e., during assertion of bypass signal 112), the power-delivery and bypass operations are repeated within the subsequent power stage ICs $103_2$-$103_N$ in response to phase-staggered control pulses 122 ($122_1$-$122_4$ in the diagram of FIG. 3), yielding the pulse waveforms shown in dashed outline at the respective $V_{OUT}$ nodes 114 of the power stage ICs.

A fault within any one of the power stages $103_1$-$103_N$ may prevent it from delivering a proper load current during its respective timing interval, resulting in fluctuation errors in $V_{LOAD}$ 120. Accordingly, faults within the controller 101 may result in miscued phase-staggered control pulses $122_1$-$122_N$, also contributing to fluctuation errors in $V_{LOAD}$ 120. It is therefore desired for a means to detect and adjust for faults in both the power stages $103_1$-$103_N$ and the controller IC 101 without sacrificing the performance of the device.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

A power-delivery integrated circuit (IC) device having a master and a plurality of slave devices is disclosed in various embodiments. Each slave device is identical in architecture to the master and includes: a master stage for generating digital pulse-width-modulated control (DPWM) signals; a cascade stage for routing the DPWM and current information signals to and from the slave and master devices, respectively; and a power stage for generating a load current based on the DPWM signals. The disclosed embodiments include additional circuitry for detecting fault conditions in the master and/or slave devices, and for automatically adjusting an amount of load current delivered by each power module in response to a fault detection.

Figure 1:
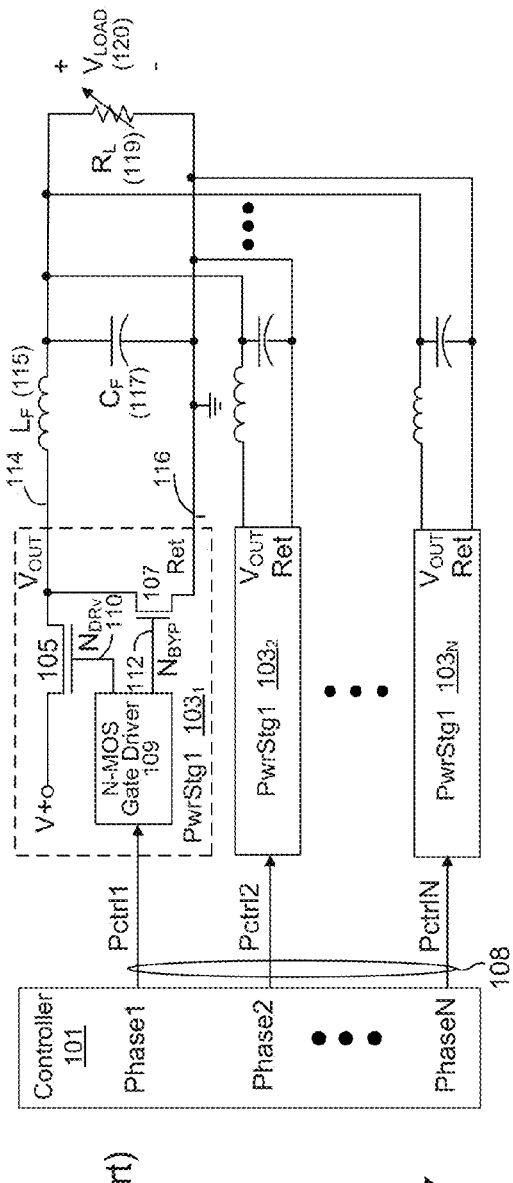
FIG. 1 illustrates a prior-art IC-based power delivery system.
Figure 3:
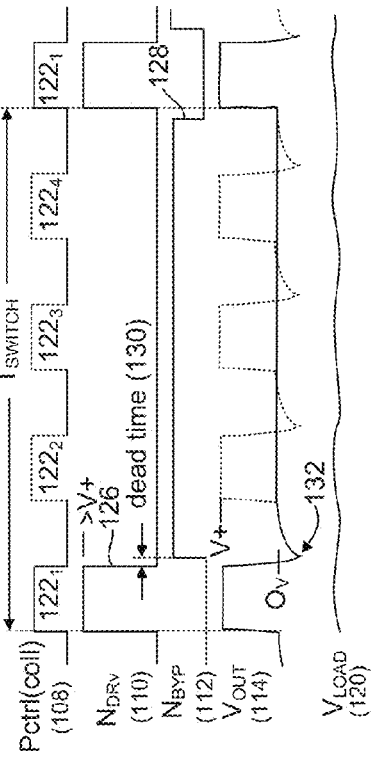
FIG. 3 illustrates waveforms generated at various nodes within the prior-art IC-based power delivery system of FIG. 1.
Figure 2:
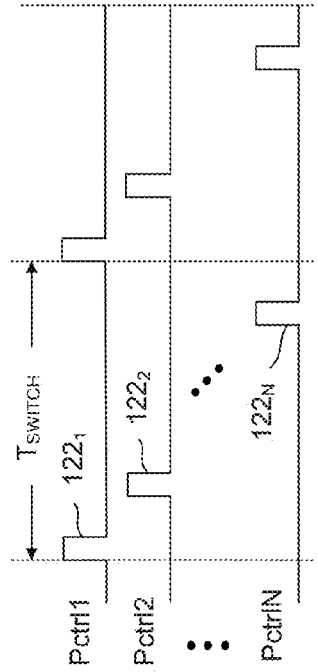
FIG. 2 illustrates a set of pulse-width modulated control signals generated within the prior-art IC-based power delivery system of FIG. 1.
Figure 4:
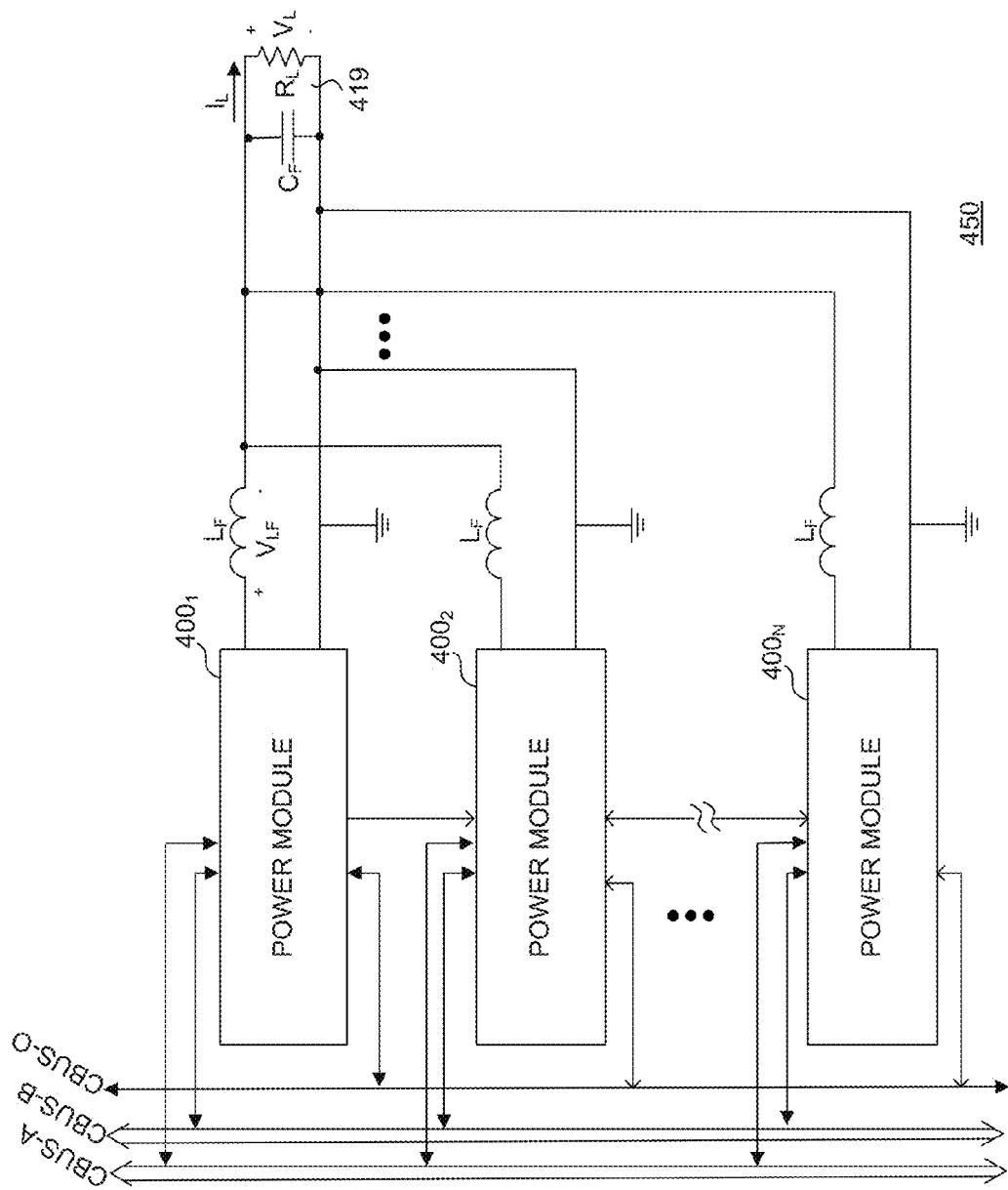
FIG. 4 illustrates a power delivery system according to an embodiment.

FIG. 4 illustrates a power delivery system 450 according to an embodiment. The power delivery system 450 includes a plurality of individual power modules $400_1$-$400_N$ arranged in a depth-cascade. In a preferred embodiment the power delivery system 450 is a synchronous system, wherein each of the power modules $400_1$-$400_N$ operates under the same clock signal (i.e. same frequency and phase). Alternatively, the power delivery system 450 may be a mesochronous system (i.e. same frequency but different phases). Each of the power modules $400_1$-$400_N$ in the cascade is coupled to bidirectional cascade buses CBUS_O, CBUS_A, and CBUS_B. By default all of the power modules $400_1$-$400_N$ are designated slave devices, and upon initialization, one of the power modules $400_1$-$400_N$ will be designated as the master device. For example, if power module $400_1$ is assigned as the master device then power modules $400_2$-$400_N$ will become its slaves. During normal operation, the master device generates a series of digital pulse-width-modulated (DPWM) control signals which are provided to one or more slave devices. For example, the master $400_1$ may sequentially output the DPWM signals to each of the slave devices $400_2$-$400_N$ via bidirectional cascade bus CBUS_A. Upon reception of a DPWM signal each power module $400_1$-$400_N$ (including the master) delivers a respective current to the load 419 ($R_L$), each at a time and for a duration indicated by the duty cycle represented on the incoming DPWM control signal. In alternative embodiments, the control signals provided by the master device may be standard (e.g. analog) PWM control signals.

The DPWM control signal comprises a plurality of DPWM codes. Each DPWM code is a digitally-encoded representation of a standard PWM control signal having a duty cycle which is determined by the master device. For example, a duty cycle may be represented as a 9-bit binary DPWM code which, when received by a DPWM decoder, is converted into an analog PWM pulse having the respective duty cycle. A major advantage of DPWM signaling, over standard PWM signaling, is increased signal integrity. For example, standard PWM control signals are represented as analog pulses which are subjected to noise and other various distortions along the signaling path, thus altering the duty cycle of the PWM pulses. This may have a direct impact on the amount of current that is delivered to the load $R_L$. On the other hand, slight noise variations may not alter the binary value of a DPWM code, thus resulting in a more accurate transfer of duty cycle information via DPWM signaling.

In order to detect faults in a slave device, the master device typically receives information indicative of an amount of current being delivered by each slave. For example, upon delivering a current to the load $R_L$, each slave $400_2$-$400_N$ may output respective current information to the master $400_1$ via bidirectional cascade bus CBUS_B. The master device compares the current information from all of the power modules $400_1$-$400_N$ and determines if there is a fault condition in any of the power modules $400_1$-$400_N$ (e.g. if any of the current information differs significantly among the power modules $400_1$-$400_N$, wherein the current information is averaged over a sufficiently long time period). Upon detecting a fault in a slave device, the master broadcasts a "failure" code to each slave device indicating the faulty slave device. In an embodiment, the failure code is signaled on the cascade bus CBUS_A. In response to the failure code, the faulty slave device disables itself from participating in any subsequent power-delivery operations, and each of the remaining slave devices automatically reconfigures its new position within the cascade. The master device then computes and generates a new set of DPWM signals for the remaining (N−1) power modules. For example if a fault is detected in a power module $400_3$, the master device $400_1$ broadcasts a failure code to each of the power modules $400_1$-$400_N$, indicating power module $400_3$ is a faulty device. The master device $400_1$ then changes its control parameters to adjust for the loss of a power module. For example, upon receiving the failure code, power module $400_3$ effectively disables itself from the cascade, thus in order to compensate for the loss of current provided by power module $400_3$, the master device $400_1$ thus increases the duty cycle represented on the DPWM signals output to the remaining power modules. Additionally, each of the remaining power modules subsequently reconfigure their logical positions within the cascade. For example, power modules $400_4$-$400_N$ may reconfigure themselves as power modules $400_3$-$400_{N-1}$, respectively (i.e. power module $400_4$ becomes power module $400_3$, power module $400_5$ becomes power module $400_4$, etc.). Note that since power modules $400_1$ and $400_2$ are originally positioned before the faulty power module $400_3$, these power modules need not reconfigure their positions within the cascade. In alternative embodiments, a fault may be detected within the master device itself, in which case the master device may issue a command to effectively assign a new master among the slave devices before shutting itself down.

Figure 5:
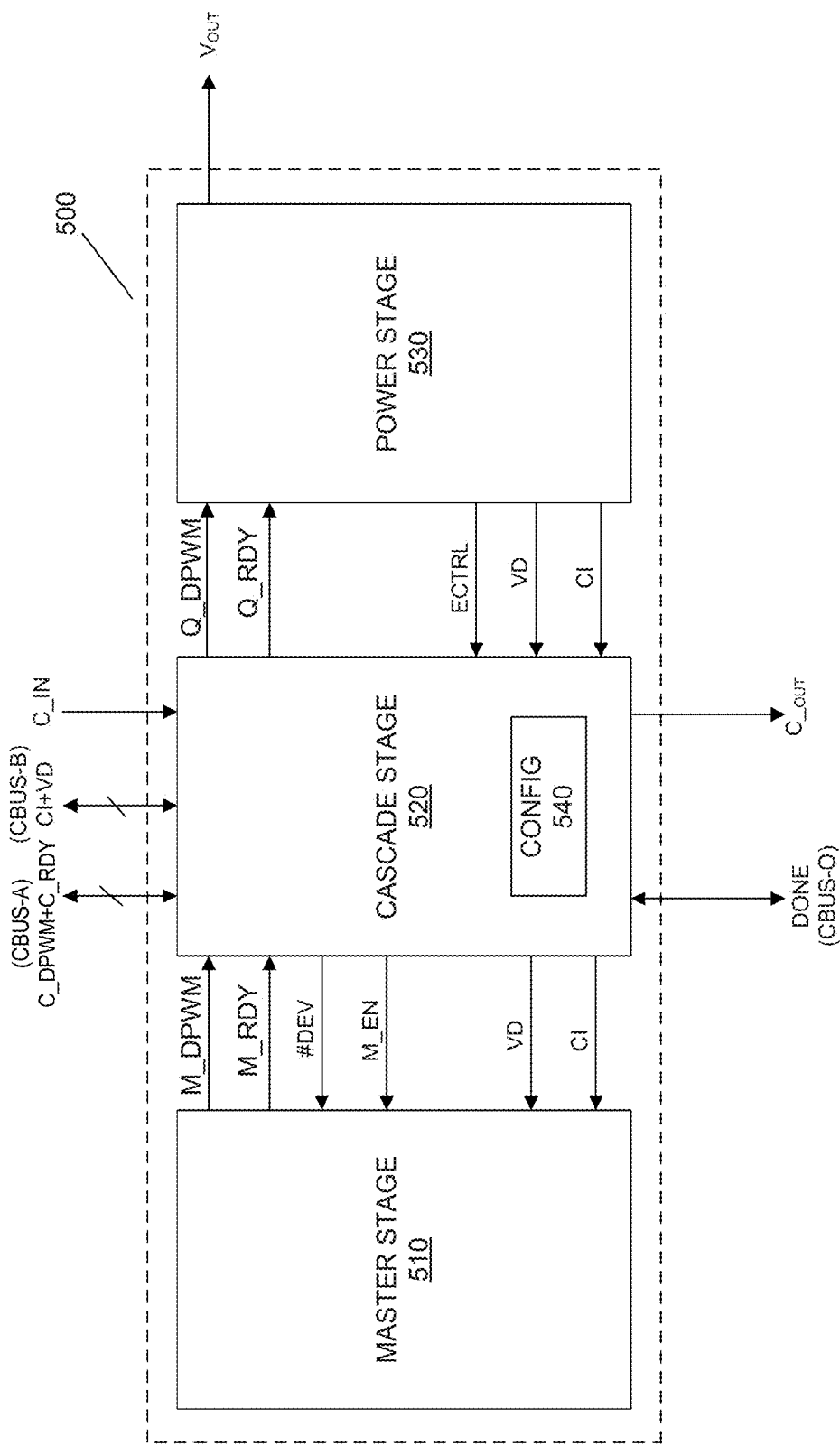
FIG. 5 illustrates a power module according to an embodiment.

FIG. 5 illustrates a power module 500 according to an embodiment. Power module 500 includes a, master stage 510, a cascade stage 520, and a power stage 530. Cascade stage 520 includes configuration register 540, which will be discussed in further detail below. During initialization, configuration register 540 determines whether or not power module 500 is to be assigned as the master device, and accordingly, either asserts or de-asserts an enable signal (M_EN) provided to the master stage 510. Configuration register 540 also determines the total number of power modules in the system and outputs this information (#DEV) to the master stage 510. In alternative embodiments, the configuration register 540 may be included in the master stage 510.

If M_EN is asserted, power module 500 is the master device, and the master stage 510 begins generating DPWM codes for each power module in the system. The DPWM codes are output sequentially to the cascade stage 520 as master DPWM signals (M_DPWM). The cascade stage 520 outputs cascade DPWM signals (C_DPWM), based on the received M_DPWM signals, to each slave device via cascade bus CBUS_A. In addition, the cascade stage 520 passes M_DPWM to the power stage 530, as qualified DPWM signals (Q_DPWM). In order to indicate the start of a new plurality of DPWM codes, the master stage 510 may output a master ready pulse (M_RDY) to the cascade stage 520 in parallel with M_DPWM. For example, in a system comprising N number of power modules, the master stage 510 may output a M_RDY pulse at the start of every plurality of N consecutive DPWM codes. In alternative embodiments, the master stage 510 may output the M_DPWM signals without the respective M_RDY pulses. For example, in a synchronous system, each power module to receive the M_DPWM signal may rely on an internal timing logic to determine when to begin sampling for a respective DPWM code. The cascade stage 520 generates a series of cascade ready pulses (C_RDY) based on each received M_RDY, for output to each slave device via cascade bus CBUS_A. The cascade stage 520 also delivers the M_RDY pulse to the power stage 530 as a qualified ready pulse (Q_RDY). The power stage 530 converts a DPWM code, indicated by Q_RDY, from the Q_DPWM signals to an analog pulse-width modulated signal (PWM). The power stage 530 then delivers a respective current to a load $R_L$, based on the duty cycle of the PWM signal, and sends current information (CI) back to the cascade stage 520. The cascade stage 520 directs CI from the power stage 530, and current information received from one or more slave devices, back to the master stage 510 for processing and fault detection. In an embodiment, a valid pulse (VD) may be provided in parallel with CI, to indicate when valid current information is available. In alternative embodiments, the power stage 530 may output the current information without the respective VD pulses. For example, in a synchronous system, the master stage 510 to receive the current information may rely on an internal timing logic to determine when to begin sampling for a respective CI value.

If M_EN is not asserted, power module 500 is a slave device, and the master stage 510 does not output DPWM signals. In an embodiment, the master stage 510 of a slave device continues to process duty cycle information but does not output M_DPWM or M_RDY if M_EN is not asserted (e.g. M_DPWM and M_RDY are gated by M_EN). In alternative embodiments, the master stage 510 of a slave device may remain completely inactive (e.g. no duty cycle calculation or generation is performed). The cascade stage 520 receives C_DPWM and C_RDY from a master device and outputs Q_DPWM and Q_RDY, respectively, to the power stage 530. Q_DPWM is generated based on a sampling C_DPWM, and the Q_RDY pulse is determined from the series of C_RDY pulses according to a device ID tag (ID) associated with power module 500. The power stage 530 converts a DPWM code, indicated by Q_RDY, from the M_DPWM signals to a PWM signal. The power stage 530 then delivers a respective current to a load $R_L$, based on the duty cycle of the PWM signal. The cascade stage 520 receives CI and VD signals from the power stage 530 and forwards them to a master device via CBUS_B.

Figure 6:
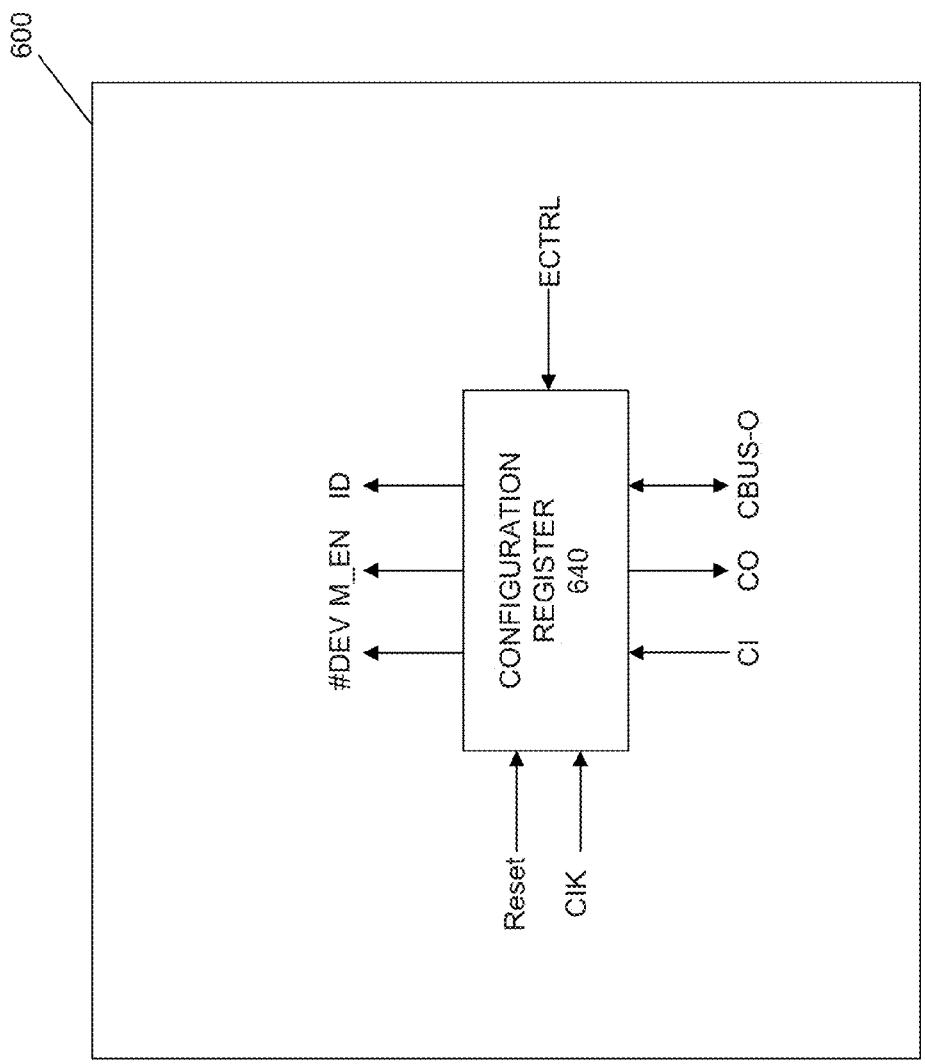
FIG. 6 illustrates a configuration register according to an embodiment.

FIG. 6 illustrates a configuration register 640 according to an embodiment. In an embodiment, configuration register 640 is included within a cascade stage of power module 600. Alternatively, configuration register 640 may be included within a master stage of power module 600. During an initialization process, configuration register 640 determines a device ID of power module 600 and whether or not the power module 600 is a master device.

Figure 7A:
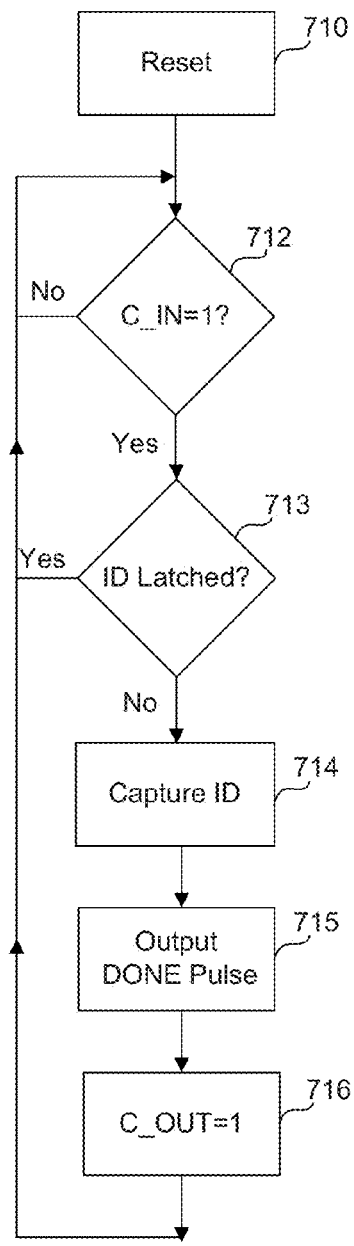
FIG. 7A illustrates an operation of a configuration register according to an embodiment.

FIG. 7A illustrates an operation of configuration register 640 according to an embodiment. Configuration register 640 is reset at 710 signaling the start of an initialization phase. At 712, configuration register 640 detects whether a cascade-in signal (C_IN) is asserted, and will continue to repeat this step until C_IN is asserted to a logic high state. In an embodiment, C_IN is provided as a cascade-out signal (C_OUT) from another power module in a cascade. In other embodiments, C_IN may be tied to a logic high state if power module 600 is the first (i.e. top-most) device in the cascade. Once C_IN is asserted, configuration register 640 then determines whether a device ID has been latched. If a device ID has already been latched then the operation of configuration register 640 loops back to the step of detecting C_IN at 712, otherwise a device ID is captured and stored by configuration register 640. In an embodiment, the device ID corresponds to a count (COUNT) of the total number of power modules that have already been initialized thus far. For example, if COUNT is equal to zero at the time of initialization, then cascade register captures and stores a device ID value equal to one (i.e. ID=COUNT+1). After the value of ID is captured, configuration register 640 outputs a done pulse (DONE) onto CBUS_O at 715 and asserts C_OUT at 716. Configuration register then loops back to the step of detecting C_IN at 712, and will continue to check that C_IN has been asserted (712) and that the device ID has been captured (713) until the initialization phase has ended.

Figure 7B:
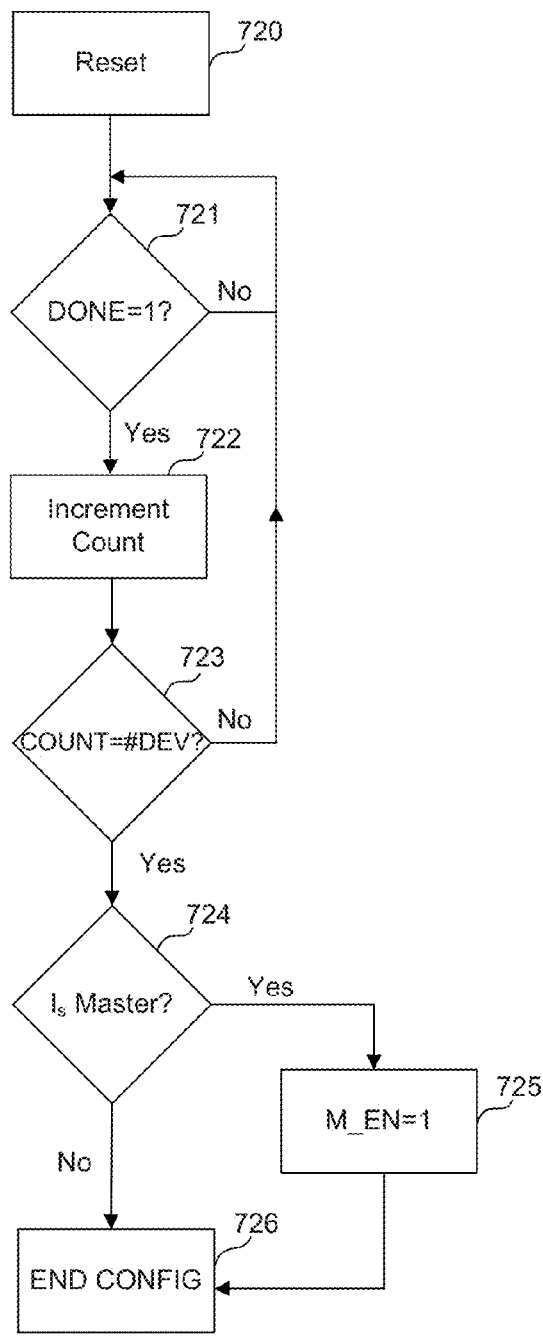
FIG. 7B illustrates an operation of a configuration register according to another embodiment.

FIG. 7B illustrates an operation of configuration register 640 according to another embodiment. Configuration register 640 is reset at 720 signaling the start of an initialization phase. At 721, configuration register 640 continuously monitors CBUS_O for DONE pulses. Upon detecting a DONE pulse, configuration register 640 increments COUNT at 722 and then checks if the value of COUNT is equal to the total number of power modules set to operate in the cascade (#DEV) at 723. In an embodiment, #DEV is a pre-determined value and is loaded into the configuration register 640 prior to initialization. If COUNT is not equal to #DEV, then configuration register 640 continues to monitor CBUS_O for DONE pulses at 721. At 724, configuration register 640 determines whether power module 600 is to be assigned as a master device. Configuration register 640 asserts M_EN at 725 if power module 600 is the master device, otherwise the initialization process is simply terminated at 726. In an embodiment, the first logical device in the cascade (ID=1) is automatically assigned as the master. Once M_EN is determined by configuration register 640, the initialization process is terminated and power module 600 enters into a normal mode of operation. In an alternative embodiment, #DEV may be configured at runtime. For example, the initialization phase may be timed such that all of the power modules in the cascade are provided a chance to configure themselves within a fixed period of time. The power modules still configure themselves one after another, in the manner described above, however instead of comparing COUT to #DEV at 723, the end of the initialization phase is determined by when the fixed period of time expires. At the end of such a time period, #DEV is simply assigned the total COUNT value. In certain embodiments, the time period for initialization may be programmable.

In an embodiment, the operations illustrated in FIGS. 7A and 7B are performed concurrently with one another (i.e. in parallel).

Figure 8:
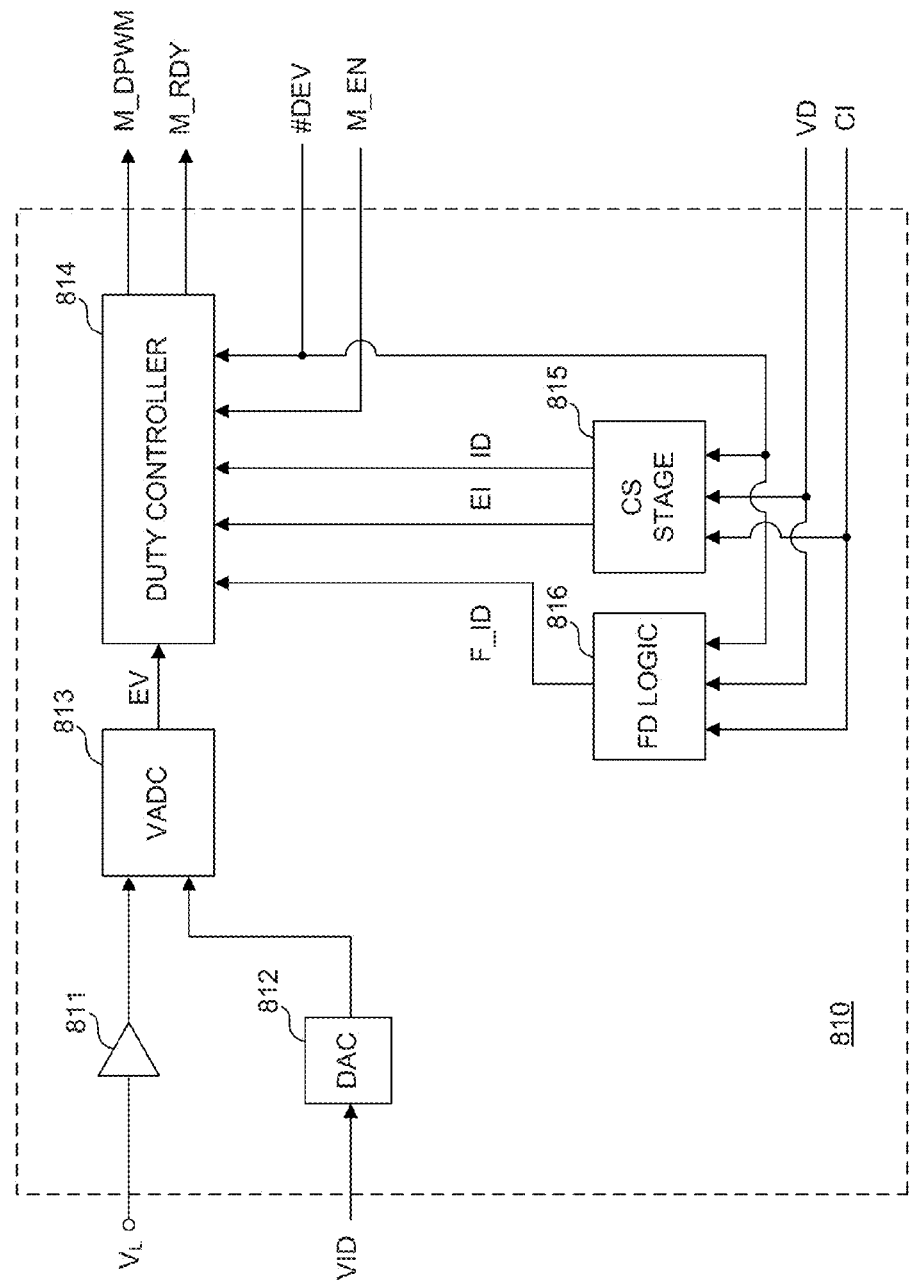
FIG. 8 illustrates a master stage according to an embodiment.

FIG. 8 illustrates a master stage 810 according to an embodiment. Master stage 810 includes a sense amplifier 811, a digital-to-analog converter (DAC) 812, voltage analog-to-digital converter (VADC) 813, duty cycle controller 814, current sharing stage 815, and fault detection logic 816. An analog voltage ($V_L$), measured across a load $R_L$, is compared against a set-point voltage (VID) in VADC 813. In an embodiment, $V_L$ is passed through an anti-aliasing filter to remove signaling distortions prior to input into VADC 813. VID is generally provided to the master stage 810 as a digital input value (e.g. 1.2V) and is thus converted to an analog signal, via DAC 812, for comparison within VADC 813. VADC 813 computes a difference between the $V_L$ and VID signals and outputs a voltage error term (EV), which is a digital representation of the voltage difference, to duty controller 814. Duty controller 814 calculates duty cycles of the pulses to be represented on a M_DPWM signal based on the total number of power modules set to operate in a cascade (#DEV). In an embodiment, duty controller 814 includes a proportional-integral-derivative (PID) controller for adjusting the duty cycles in response to the values of EV. For example, duty controller 814 may increase the duty cycles provided to each power module if EV indicates that $V_L$ is lower than VID and decrease the duty cycles if $V_L$ is higher than VID. Duty controller 814 then outputs the M_DPWM signal, and a M_RDY pulse, to a cascade stage. In an embodiment, the outputs of duty controller 814 are gated by M_EN. Thus, duty controller 814 outputs M_DPWM and M_RDY only if M_EN is asserted (i.e. it is the master device).

Current information (CI) and VD pulses are received by current sharing stage 815 and fault detection logic 816. Current sharing stage 815 compares each of the received CI values against a reference value and outputs a current error term (EI) and a respective device ID to the duty controller 814. In an embodiment, the reference value is the CI value of the master controller and the device ID is generated based on the VD pulses. In alternative embodiments, the reference value may be generated based on a running average of received CI values. In yet other embodiments, the device ID may be generated based on an internal timing logic. Duty controller 814 then adjusts an individual duty cycle provided to each power module in the cascade based on the values of EI and ID. For example, if EI indicates that the current delivered by a second power module in the cascade (ID=2) is lower than the reference value and that the current delivered by a third power module (ID=3) is higher than the reference value, duty controller 814 may increase the duty cycle provided to the second power module and decrease the duty cycle provided to the third power module accordingly.

Fault detection logic 816 determines fault conditions in the power modules based on the received CI values and, upon detection of a fault condition, outputs a faulty device ID (F_ID) to duty controller 814. In an embodiment, a fault is detected if CI simply falls below or rises above a predetermined threshold level. In alternative embodiments, the threshold may vary depending on an amount of deviation from a reference value as discussed above. In yet other embodiments, a fault may be detected based on successive CI values received from a particular power module. In other words, fault detection logic 816 may provide duty controller 814 with ample time to adjust for any measured deficiencies in the currents before implicating a faulty power module. For example, the second power module (ID=2) may output a CI value that is below the threshold level in response to a first DPWM code received by the power module. Upon determining a first indication of a fault condition, fault detection logic 816 does nothing, thus giving the duty controller 814 a chance to correct the error by increasing the duty cycle provided to the power module. If, after one or more successive DPWM cycles, CI from the second power module is still below the threshold level, fault detection logic 816 may output a faulty device ID indicating that the second power module has a fault condition (F_ID=2). Upon receiving a F_ID indicator, duty controller 814 broadcasts a failure code indicating the second power module (ID=2) of the cascade is to be disabled.

A fault may also be detected within the duty controller 814 of the master device, based on the received current information. For example, if after a period of time, the load voltage $V_L$ is still not equal to VID (or at least within an allowable range), the duty controller 814 may determine a fault condition within the master device itself (ID=1). In response to detecting itself as a faulty device, the master stage 810 dynamically transfers the role of the master device to a slave device before disabling itself from the cascade. For example, the master stage 810 may broadcast a failure code indicating its own device ID before disabling itself. In response, the second power module (previously ID=2) of the cascade takes over the role of the master device. All the while the duty controller of the second power module has been processing duty cycle information and is therefore capable of outputting M_DPWM signals as soon as the second power module is assigned as the master (i.e. M_EN is asserted). In alternative embodiments, the master stage 810 may, upon detecting it is the faulty device, disable itself from the cascade and broadcast a command to reset the entire system. For example, a configuration register of each slave device may be reset, thus re-invoking the initialization steps described in FIGS. 7A and 7B.

Master stage 810 may include additional circuitry for controlling the duty cycle output by duty controller 814. In an embodiment, overshoot protection circuitry may be provided to shut down the duty controller 814, or prevent it from outputting DPWM signals, in response to a large and abrupt change in $V_L$. For example, the load resistance $R_L$ may suddenly change (or be removed) resulting in an abrupt backflow of current from the load $R_L$ to a capacitor $C_F$, thus causing a sharp spike in the load voltage $V_L$. The response time of duty controller 814 in the case of such severe overshoot is limited due to the PID loop, thus making it desirable to simply prevent the duty controller 814 from further outputting DPWM signals. In another embodiment, active voltage positioning circuitry may be provided to automatically adjust the set-point voltage (VID) based on an amount of current flowing through the load $R_L$. For example, a VID is initially provided as an approximate desired value, but upon measuring a resulting current which flows through the load $R_L$ it may be determined that the specified VID value is too high and thus needs to be reduced.

Figure 9:
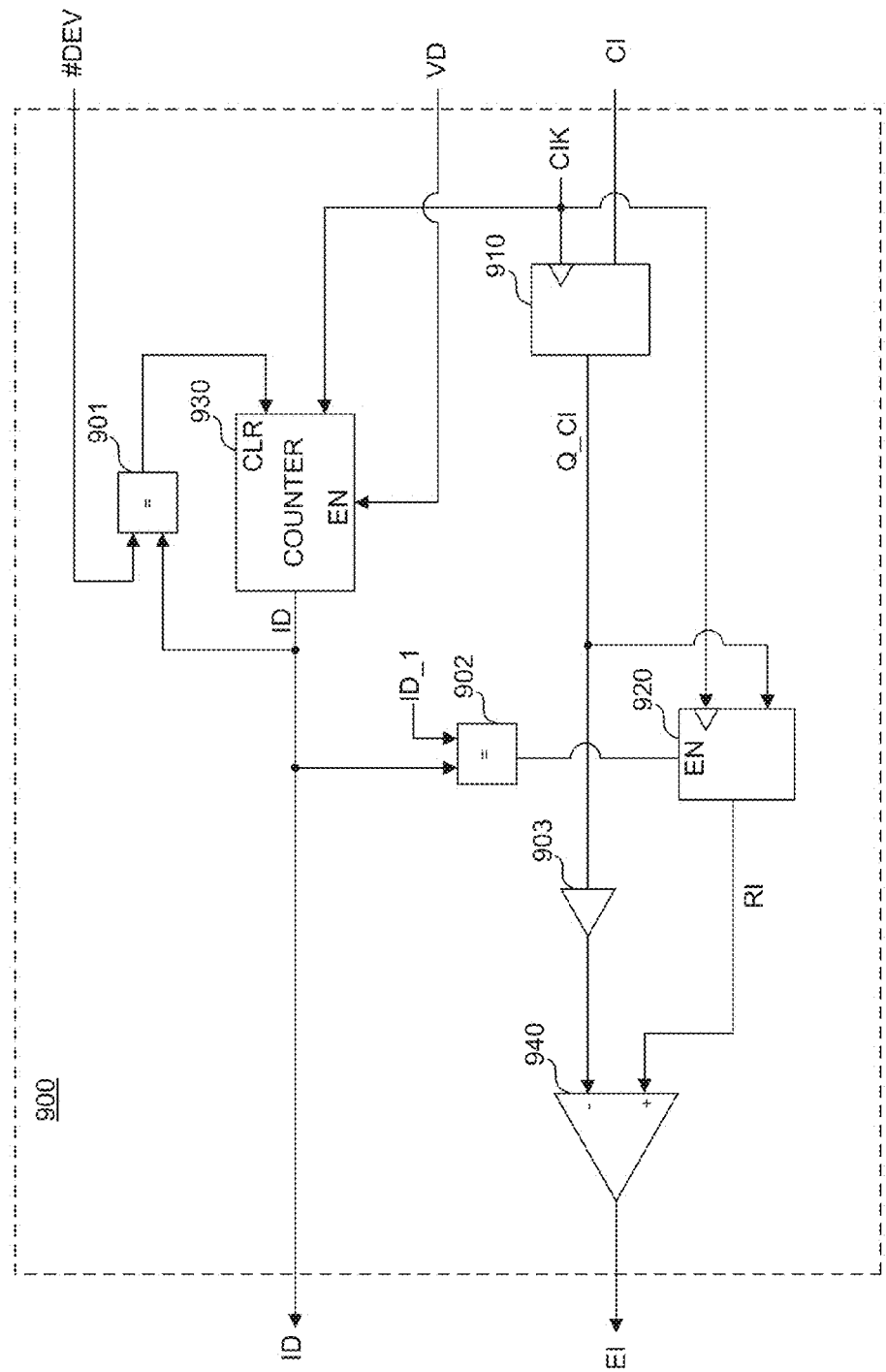
FIG. 9 illustrates a current sharing stage according to an embodiment.

FIG. 9 illustrates a current sharing stage 900 according to an embodiment. Current sharing stage 900 includes a receiver 910, a storage element 920, a counter 930, and a comparator 940. The receiver 910 may be, for example, a latch or a flip-flop or other storage circuit. The receiver 910 is coupled to receive CI signals from a cascade stage and sample the CI signals with respect to a clock signal (clk). The counter 930 is provided for determining device IDs, for respective CI values, based on the VD pulses. Upon reception of a VD pulse, the counter 930 increments a count value. The count value is output from the counter 930 and is provided to comparators 901 and 902 as a device ID. The comparator 901 compares the ID value with #DEV to determine when to reset the counter 930. Thus, when the value of ID is equal to #DEV, the comparator 901 is cleared and the value of ID will be set to one (ID=1) following a subsequent VD pulse. The comparator 902 receives ID and determines whether the value of ID is equal to a first device ID value (ID_1). Thus, when ID is equal to ID_1 the comparator 902 outputs an enable signal to enable a respective Q_CI value to be latched into storage element 920. The contents of storage element 920 are provided to comparator 940 as a reference value (RI) for comparison with all Q_CI values output from the receiver 910. In an embodiment, RI corresponds to the CI value output by the master device. For example, a Q_CI value is latched into storage element 920 when a respective value of ID is equal to one (ID=1). Delay element 903 is provided along the Q_CI signal path such that RI and Q_CI signals arrive at the inputs to comparator 940 at approximately the same time. Comparator 940 then outputs the difference between the received values for RI and Q_CI as a current error term (EI). In an alternative embodiment, a delay element may be provided along the ID signal path such that EI and ID signals arrive at the inputs to a duty controller at respective times relative to one another.

Figure 10:
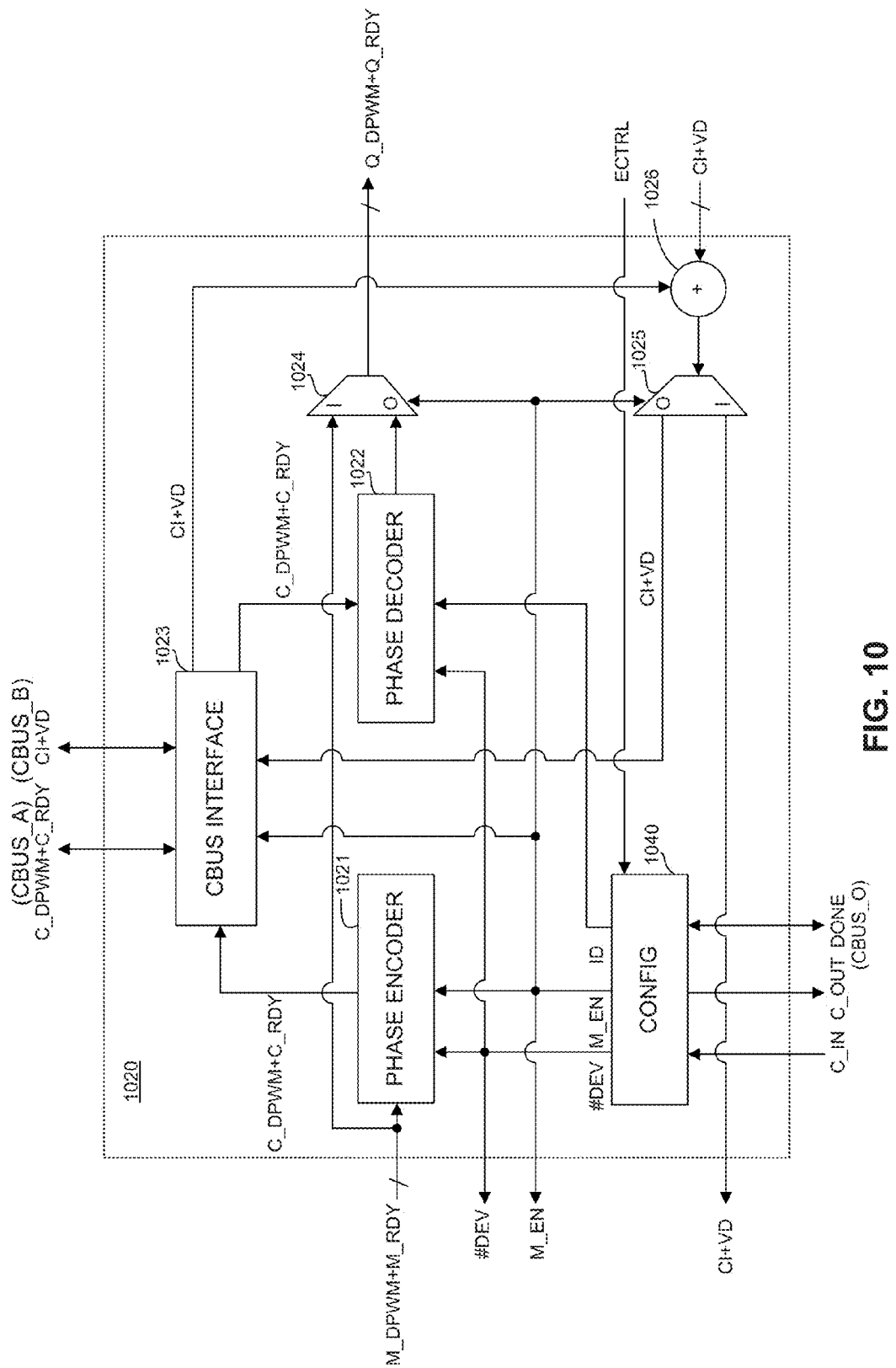
FIG. 10 illustrates a cascade stage according to an embodiment.

FIG. 10 illustrates a cascade stage 1020 according to an embodiment. Cascade gage 1020 includes phase encoder 1021, phase decoder 1022, cascade bus interface 1023, and configuration logic 1040. Phase encoder 1021 receives a M_DPWM signal and respective M_RDY pulse from a master stage, and outputs a C_DPWM signal and a respective series of C_RDY pulses to the cascade bus interface 1023. The C_DPWM signal is generated based on the M_DPWM signal, and the series of C_RDY pulses is generated from the M_RDY pulse. The cascade bus interface 1023 receives M_EN and, depending on the state of M_EN, either outputs or receives C_DPWM and C_RDY signals via CBUS_A. For example, if cascade stage 1020 belongs to a master device (i.e. M_EN is asserted) then the cascade bus interface 1023 may be configured to provide C_DPWM and C_RDY signals to all of the slave devices in the cascade. If cascade stage 1020 belongs to a slave device (i.e. M_EN is not asserted) then the cascade bus interface 1023 is may be configured to receive C_DPWM and C_RDY signals from a master device and output the signals to phase decoder 1022. Phase decoder 1022 generates a decoded DPWM signal (D_DPWM) based on the C_DPWM signal and a decoded RDY pulse (D_RDY) from the series of C_RDY pulses. D_DPWM and D_RDY are provided to a first input of a multiplexer 1024, and a second input of the multiplexer 1024 is coupled to receive M_DPWM and M_RDY from the master stage. M_EN is provided to select M_DPWM (and M_RDY) or D_DPWM (and D_RDY) to be output from the multiplexer 1024. For example, if M_EN is asserted (i.e. it is the master device) M_DPWM is selected as the qualified DPWM signal (Q_DPWM), and if M_EN is not asserted (i.e. it is a slave device) D_DPWM is output as Q_DPWM. In alternative embodiments, multiplexer 1024 may comprise of multiple multiplexer circuits (i.e. a multiplexer circuit to receive M_DPWM and D_DPWM and a separate multiplexer circuit to receive M_RDY and D_RDY).

A receiver 1026 is provided to receive current information (CI) and valid (VD) pulses from each of the master and slave devices. The receiver 1026 combines the received CI and VD signals from the master and slave devices onto a single signal path which is coupled to the input of a de-multiplexer 1025. In an embodiment, the receiver 1026 may be in the form of an adder. For example, because CI is sampled in relation to DPWM (as discussed in further detail below), there should be no overlap in time between the CI signals received from the master and the CI signals received from the slaves. M_EN is provided to the de-multiplexer 1025 to select the CI and VD signals to be output to the cascade bus interface 1023 or directly to the master stage. For example, if M_EN is asserted (i.e. it is the master device), CI and VD are provided to the master gage, and if M_EN is not asserted (i.e. it is a slave device), CI and VD are provided to the cascade bus interface 1023. In alternative embodiments, de-multiplexer 1025 may comprise of multiple de-multiplexer circuits (i.e. a de-multiplexer circuit to receive CI and a separate de-multiplexer circuit to receive VD). The cascade bus interface 1023 either outputs or receives CI and VD signals, via CBUS_B, depending on the state of M_EN. Thus, if cascade stage 1020 belongs to a master device (i.e. M_EN is asserted) then the cascade bus interface 1023 is configured to receive CI and VD signals from each of the slave devices in the cascade. On the other hand, if cascade stage 1020 belongs to a slave device (i.e. M_EN is not asserted) then the cascade bus interface 1023 is configured to output CI and VD signals to the master device.

Figure 11:
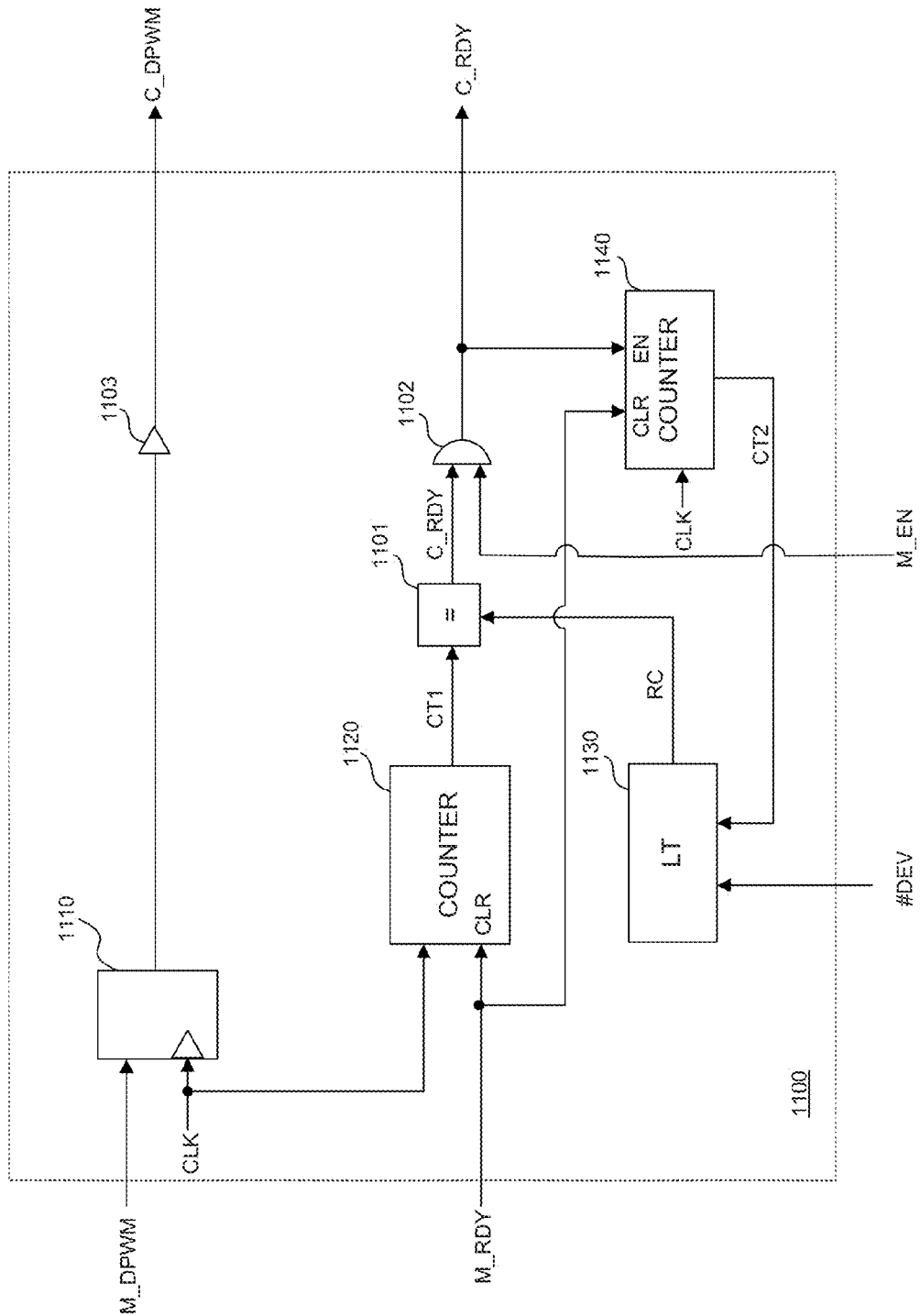
FIG. 11 illustrates a phase encoder according to an embodiment.

FIG. 11 illustrates a phase encoder 1100 according to an embodiment. Phase encoder 1100 includes a receiver 1110, a first counter 1120, a look-up table 1130, a second counter 1140, a comparator 1101, and a logic gate 1102. The receiver 1110 may be, for example, a latch or a flip-flop or other storage circuit. The receiver 1110 latches a M_DPWM signal, with respect to a clock signal (clk), and outputs the latched M_DPWM as a C_DPWM signal. A first count value (CT1) of the first counter 1120 is cleared (i.e. reset to zero) in response to the M_RDY pulse, and the value of CT1 is subsequently incremented with respect to clk. CT1 is provided to the comparator 1101 which compares the value of CT1 with a reference value (RC) received from the look-up table 1130 and outputs a C_RDY pulse when the value of CT1 is equal to RC. The C_RDY pulse output from the comparator 1101 is gated by M_EN at the logic gate 1102. Logic gate 1102 may be, for example, a logic AND gate. Thus, C_RDY pulses are output from phase encoder 1100 only if M_EN is asserted (i.e. it is the master). In an embodiment, a delay element 1103 is provided along the C_DPWM signal path to adjust a timing offset between the C_DPWM signals and respective C_RDY pulses. C_RDY is provided to an enable input of the second counter 1140. A second count value (CT2) of the second counter 1140 is cleared in response to the M_RDY pulse, and the value of CT2 is incremented each time a valid C_RDY pulse is provided at the enable input of the second counter 1140. The look-up table 1130 is coupled to receive CT2 and generate RC based on the value of CT2 and a value of #DEV.

For example, suppose there is a 1 MHz switching interval between respective M_RDY pulses, and suppose the clk has a signaling frequency of 48 MHz. Thus, for a total of six power modules operating in the cascade (#DEV=6) a C_RDY pulse may be output once every eight clk cycles. CT2 is cleared (CT2=0) in response to a first M_RDY pulse and, based on the value of #DEV (#DEV=6), the look-up table 1130 generates a RC value of 1 (RC=1). When the value of CT1 is equal to RC (i.e. CT1=8) the comparator 1101 outputs a C_RDY pulse, and in response (assuming M_EN is asserted) the second counter 1140 increments the value of CT2 (CT2=1). The look-up table 1130 now generates a new value of RC (RC-16) based on the new CT2 value. This cycle is repeated, for every M_RDY pulse, to generate a respective C_RDY pulse for each of the slave devices in the cascade. Thus, in the previous example (#DEV=6), a total of five C_RDY pulses are generated in response to a single M_RDY pulse.

Figure 12:
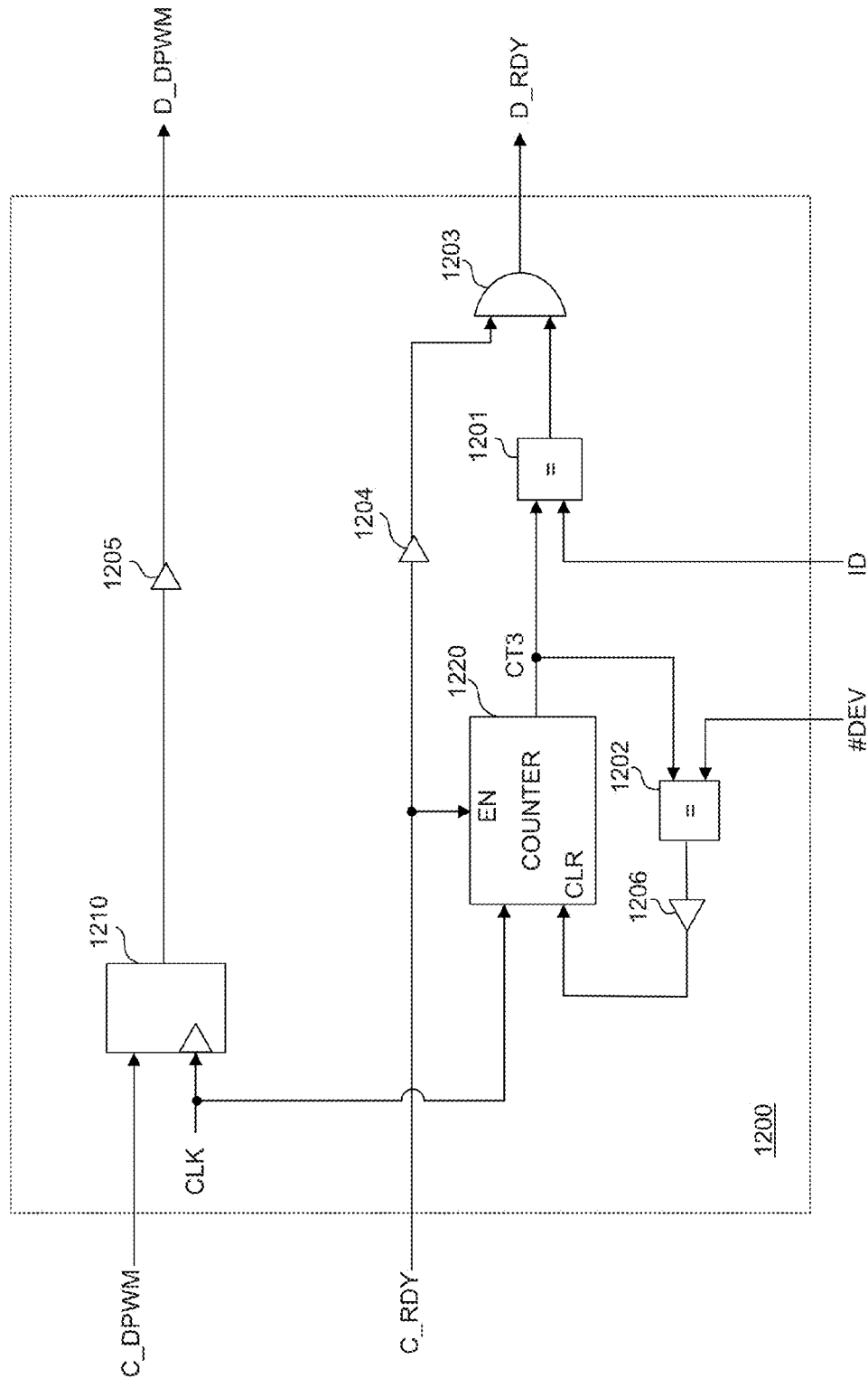
FIG. 12 illustrates a phase decoder according to an embodiment.

FIG. 12 illustrates a phase decoder 1200 according to an embodiment. Phase decoder 1200 includes a receiver 1210, a counter 1220, a first comparator 1201, a second comparator 1202, and a logic gate 1203. The receiver 1210 may be, for example, a latch or a flip-flop or other storage circuit. The receiver 1210 latches a C_DPWM signal, with respect to a clock signal (clk), and outputs the latched C_DPWM as a D_DPWM signal. C_RDY is additionally coupled to an enable input of the counter 1220 and to a logic gate 1203. The counter 1220 increments a count value (CT3) each time a valid C_RDY pulse is provided at its enable input. The first comparator 1201 receives CT3 and compares a value of CT3 with a specific device ID value (ID), and the output of the first comparator 1201 is used to gate a C_RDY pulse from being output by the logic gate 1203. The logic gate 1203 may be, for example, a logic AND gate. Thus, the logic gate 1203 outputs a C_RDY pulse as a D_RDY pulse based on the device ID value. For example, if phase decoder 1200 belongs to the second phase module in the cascade (ID=2), the logic gate 1203 will output the second C_RDY pulse, of a series of received C_RDY pulses, as the D_RDY pulse (i.e. when CT3=2). A delay element 1204 is provided along the C_RDY signal path to adjust a timing offset between the C_RDY pulses and an output of the first comparator 1201. The second comparator is provided to compare CT3 with a value of #DEV. An output of the second comparator 1202 is provided to clear a count value of the counter 1220 (i.e. reset the value of CT3) when CT3 is equal to #DEV. A delay element 1206 is coupled to the output path of the comparator 1202 in order to prevent the value of CT3 from being reset before a respective C_RDY pulse is received and output by the logic gate 1203. In an embodiment, a delay element 1205 is provided along the D_DPWM signal path to adjust a timing offset of the D_DPWM signals, to ensure that the D_DPWM signals do not lead a respective D_RDY pulse.

Figure 13:
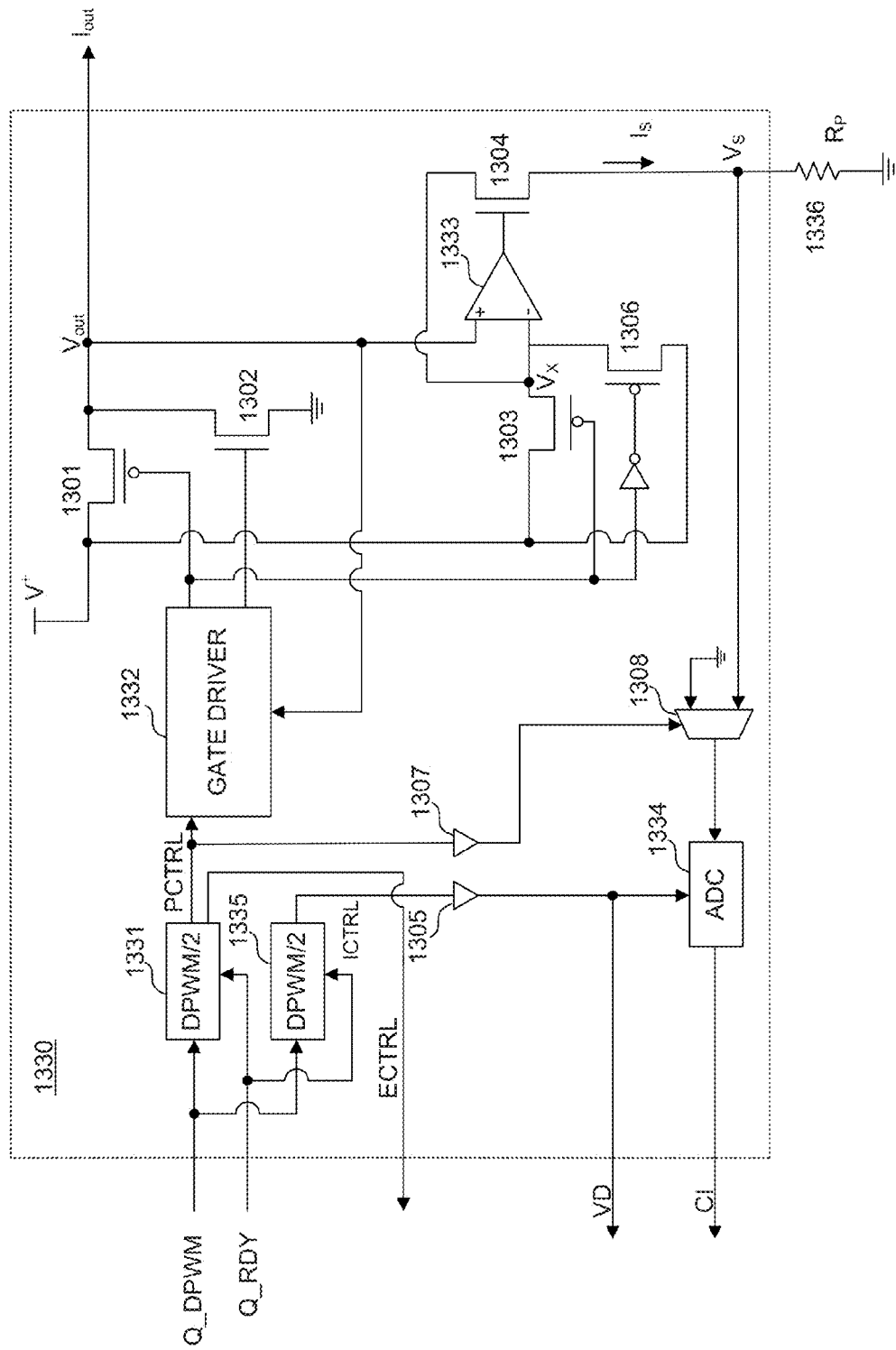
FIG. 13 illustrates a power stage according to an embodiment.

FIG. 13 illustrates a power stage 1330 according to an embodiment. Power stage 1330 includes a first DPWM decoder 1331, a gate driver 1332, an operational amplifier 1333, an analog-to-digital converter (ADC) 1334, and a second DPWM decoder 1335. Q_DPWM and Q_RDY signals are provided to the inputs of the first and second DPWM decoders 1331 and 1335. In alternative embodiments, on or more delay elements may be provided along the input paths to DPWM decoders 1331 and 1335 for adjusting a phase of the incoming signals. The first DPWM decoder 1331 samples and converts a particular DPWM code on the received Q_DPWM signal, indicated by a Q_RDY pulse, into an analog PWM control signal (PCTRL) which is provided to gate driver 1332. The gate driver 1332 then turns on PMOS transistor 1301 (i.e. asserts a logic low signal to the gate of PMOS transistor 1301) for a duration of time relative to the duty cycle of the PCTRL signal. Turning on PMOS transistor 1301 effectively establishes a connection to a voltage supply V, thus generating a respective output current ($I_{out}$) for this duration of time. For example, the gate driver 1332 may assert a logic low signal to the gate of PMOS transistor 1301 in response to a rising edge of the PCTRL signal and assert a logic high signal to the gate of the PMOS transistor 1301 in response to a falling edge of the PCTRL signal. In alternative embodiments, the PMOS transistor 1301 may be replaced by an NMOS transistor. The gate driver 1332 then turns on an NMOS transistor 1302 (i.e. asserts a logic high signal to the gate of the NMOS bypass transistor 1302), thus providing a shunt path of the output current $I_{out}$. The gate driver 1332 includes a dead time controller for instituting a brief time delay (or "dead time") after the switching off of NAOS transistor 1301 and prior to the switching Oil of NMOS transistor 1302.

The output of the gate driver 1332 is additionally provided to the gate of a PMOS transistor 1303. In an embodiment, the transconductance of PMOS transistor 1303 is scaled by a factor of N relative to the transconductance of PMOS transistor 1301. Thus, the current output from PMOS transistor 1303 is a fraction of N smaller than current output from PMOS transistor 1301. The output of PMOS transistor 1303 ($V_X$) is provided to an inverting input of the operational amplifier 1333. The non-inverting input of operational amplifier 1333 is coupled to $V_{out}$ and the output of the operational amplifier 1333 is coupled to the gate of an NMOS transistor 1304. The operational amplifier 1333 and the NMOS transistor 1304 are used to deliver a sample current ($I_S$), which is representative of $I_{out}$ (e.g., $I_{out}$--$N*I_S$, where N corresponds to a scaling factor of PMOS transistor 1303), to an external precision resistor ($R_P$). For example, with the PMOS transistors 1301 and 1303 switched on, the operational amplifier 1333 attempts to bring $V_X$ to the same voltage potential as $V_{out}$. This turns on the NMOS transistor 1304, allowing the sample current to flow through the external precision resistor that is proportional to the current flowing through the load. When the PMOS transistors 1301 and 1303 are switched off and the NMOS transistor 1302 is switched on, the voltage $V_{out}$ is pulled low and the voltage $V_X$ will subsequently be pulled low by negative feedback. However, because the charging time of $V_X$ may affect the device's performance, it may be desirable to maintain $V_X$ at a relatively high potential. Thus, in an embodiment, a second PMOS transistor 1306 is coupled between $V_X$ and the voltage supply $V^+$, wherein the gate of the PMOS transistor 1306 is coupled to receive an inverted version of the gate driver 1332 output signal provided to PMOS 1303. In this manner, PMOS 1306 is configured to switch on when PMOS transistor 1303 switches off, and vice-versa, thus maintaining $V_X$ at a constant high potential. In alternative embodiments, the PMOS transistor 1306 may be implemented by an NMOS transistor.

ADC 1334 samples a voltage ($V_S$) that is representative of $I_S$, and outputs this sampled value as the current information. In an embodiment, the ADC 1334 may additionally convert the sampled voltage $V_S$ into a sampled current Is for output as the current information (e.g., $I_S=V_S/R_P$). According to another embodiment, the ADC 1334 may convert the sampled voltage $V_S$ into a scaled output current Iout for output as the current information (e.g., $I_{out}=N*V_S/R_P$). In an embodiment, the sample voltage $V_S$ is provided at a first input of multiplexer 1308 and a low voltage potential (e.g. ground) is provided at a second input of multiplexer 1308. The PCTRL signal is coupled to a select input of multiplexer 1308 for providing the sample voltage $V_S$ to the ADC 1334 for only the duration in which PCTRL is asserted. Thus, when PCTRL is deasserted, the current information sampled and output by ADC 1334 is essentially zero. This is to ensure that the current information signal output from the power stage 1330 does not interfere with any current information signals output from other power modules in the system. $R_P$ is of a predetermined value which is known by the master stage and used to derive $I_S$ values from respective samples of $V_S$. In an alternative embodiment $R_P$ may be programmable, thus having a user-defined value. Referring back to FIG. 11, the inductor $L_F$ initially resists the flow of $I_{out}$ when PMOS transistor 1301 is first turned on, thus the value of $I_{out}$ increases (i.e. "ramps up") in relation to the duty cycle of the PCTRL signal. Thus, the second DPWM 1335 decoder is provided to generate an ICTRL signal that has half the duty cycle of a respective PCTRL signal, in order to sample $V_S$ at a midpoint of the PCTRL signal (thus yielding an average value of $I_S$). In an embodiment, the ICTRL signal is generated by simply removing a least significant bit of a respective DPWM code indicated by Q_RDY and the ICTRL signal is then phase-shifted such that its rising edge is aligned with the midpoint of the PCTRL signal and its falling edge is aligned with the falling edge of the PCTRL signal. In alternative embodiments, the duty cycle for the ICTRL signal may be generated using an arithmetic logic unit (ALU). The ICTRL signal is provided to ADC 1334 for controlling a sample-and-hold function of ADC 1334. For example, ADC 1334 continuously samples $V_S$ while the ICTRL signal is deasserted and holds a sample of $V_S$ for the duration that ICTRL is asserted. The ICTRL signal is additionally coupled to a VD signal line and is output from ADC 1334 as a VD pulse. Thus, an asserted ICTRL signal indicates that a valid current information signal is available on the CI signal line. In an embodiment, delay elements 1305 and 1307 are coupled to the ICTRL and PCTRL signals, respectively, and are provided for adjusting a delay between the time at which the gate driver 1332 receives a PCTRL signal and the time at which the PMOS transistors 1301 and 1303 are actually turned on. CI signals and VD pulses are output to a cascade stage, to be processed within the master stage of a master device.

In an embodiment, the first DPWM decoder 1331 is additionally used to decode a failure code for a faulty device. The failure code may be presented in a number of unused bits (i.e. bits that do not contain DPWM codes) of a received Q_DPWM signal. The DPWM decoder 1331 compares the decoded device ID for the faulty device against its own device ID and either permanently asserts a "tri-state" command on the PCTRL signal, or outputs a new device ID as an error control signal (ECTRL). For example, assume the second power module (ID=2) in a cascade of three power modules is determined to be the faulty device: if the faulty device ID is equal to its own device ID (e.g. ID=2) the first DPWM decoder 1331 outputs a tri-state command; if the faulty device ID is higher than its own device ID (e.g. ID=1) the first DPWM decoder 1331 outputs its own device ID (ID=1); and if the faulty device ID is lower than its own device ID (e.g. ID=3) the first DPWM decoder 1331 outputs its own device ID value decremented by one (ID=2). In response to a tri-state command the gate driver 1332 turns off both the PMOS transistor 1301 and the NMOS transistor 1302. For example, the tri-state command may simply be that the PCTRL signal is placed in a constant high-impedance state (i.e. between logic high and low). The ECTRL signal is output back to the configuration logic. In reference to FIG. 6, upon receiving an ECTRL signal, the configuration logic 600 decrements a count of the total number of devices (#DEV) and stores the value represented on the ECTRL signal as the new device ID. In this manner the power delivery system 450, in reference to FIG. 4, may seamlessly adjust for fault conditions in any of the power modules $400_1$-$400_N$.

Overshoot Trip-Point Circuitry

Figure 14:
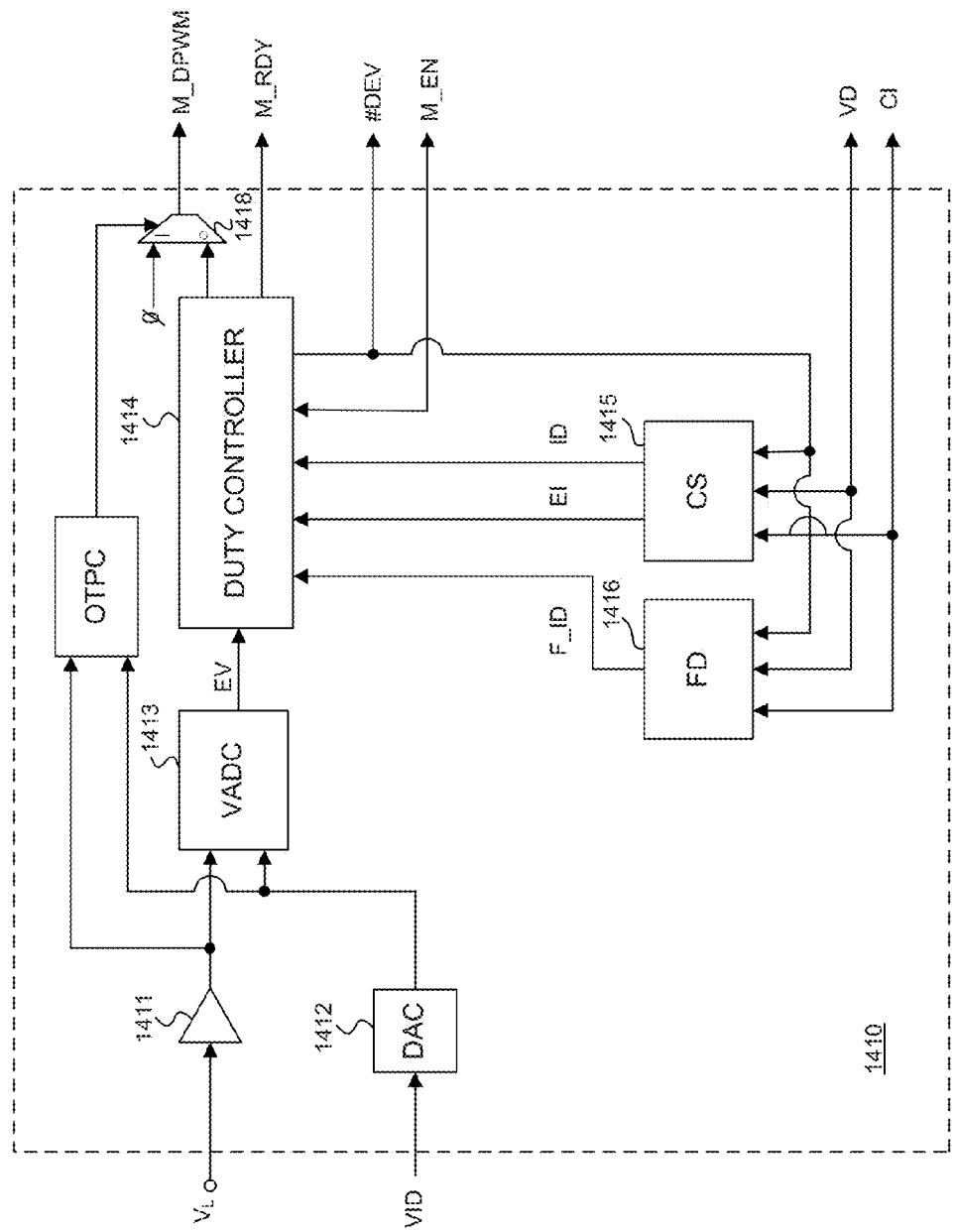
FIG. 14 illustrates a master stage according to another embodiment.

FIG. 14 illustrates a master stage 1410 according to another embodiment. Master stage 1410 includes a sense amplifier 1411, a digital-to-analog converter (DAC) 1412, voltage analog-to-digital converter (VADC) 1413, duty cycle controller 1414, current sharing stage 1415, fault detection logic 1416, overshoot trip point circuit (OTPC) 1417, and a multiplexer 1418. With the exception of OTPC 1417 and the multiplexer 1418, it is assumed, for the purposes of discussion, that each of the circuit elements of master stage 1410 function similarly to their counterparts in master stage 810, as discussed above in reference to FIG. 8. OTPC 1417 is provided as a safeguard to protect the power delivery system from large and abrupt changes in the load current which may result in severe voltage overshoot. For example, in reference to FIG. 4, abruptly disconnecting the load $R_L$, while the power delivery system 450 is supplying a constant load current $I_L$ would force all of the load current $I_L$ to flow back into the system. The inductor $L_F$ will resist the sudden change in current, forcing $I_L$ to flow through the capacitor $C_F$, thus causing the load voltage $V_L$ to shoot up. In such instances, the response time of the PID controller within duty controller 1414 may not be fast enough to adjust to such a severe voltage swing. Thus, OTPC 1417 is provided to detect such instances of voltage overshoot, and respond by immediately cutting off power delivery to the load $R_L$, and then draining the excess charge from the capacitor $C_F$, before the overshoot of $V_L$ becomes too severe.

The load voltage ($V_L$), which is an analog voltage measured across the load $R_L$, is compared with a set-point voltage (VID) in the overshoot trip point circuit 1417. In an embodiment, $V_L$ is passed through an anti-aliasing filter to remove signaling distortions prior to input into OTPC 1417. OTPC 1417 then determines, based on the received voltages and VID, whether an overshoot condition has occurred and responds accordingly by asserting an overshoot protection signal (OSP) which is provided as a select signal to the multiplexer 1418. Multiplexer 1418 has a first input coupled to receive DPWM signals generated by duty controller 1414 and a second input coupled to receive a fixed logic-low signal ("zero signal"). In an embodiment, the zero signal corresponds to a 9-bit DPWM code representing a duty cycle of zero. For example, assertion of the OSP signal enables multiplexer 1418 to output the zero signal as M_DPWM. In alternative embodiments, the OSP signal may be directly provided to the duty controller 1414, thus bypassing the need for a multiplexer 1418. For example, upon receiving an asserted OSP signal, the duty controller 1414 may simply reduce the duty cycles represented on the generated DPWM signals to zero. Once an overshoot condition is triggered, OTPC 1417 continues to monitor the load voltage $V_L$ to determine when it is safe to resume power delivery to the load $R_L$. For example, when OTPC 1417 detects that the load voltage $V_L$ has stopped increasing, it will deassert the OSP signal which enables multiplexer 1418 to output the DPWM signals of duty controller 1414 as the M_DPWM signals, thus resuming normal operation. In an embodiment, overshoot protection is executed only by OTPC 1417 in the master device. In alternative embodiments, overshoot protection may be simultaneously executed by overshoot trip point circuits in any number of slave devices.

In reference to FIG. 13, a zero signal received by power stage 1330 is converted into an analog PWM control signal (PCTRL) having a duty cycle of zero (i.e. a continuous logic-low signal). Since there is no pulse associated with the PCTRL signal having zero duty cycle, gate driver 1332, in response, turns off PMOS transistor 1301 and turn on NMOS transistor 1302. Thus, PMOS transistor 1301 and NMOS transistor 1302 remain in their respective states for the entire duration that the zero signal is asserted at the input to power stage 1330. Turning off PMOS transistor 1301 effectively disconnects the voltage supply V+ from the circuit, thus suppressing the flow of output current $I_{out}$, and turning on NMOS transistor 1302 shorts the output path of power stage 1330 to ground (or low potential), thus draining any excess output current $I_{out}$. Referring now to FIG. 4, it should be noted that each of the power modules $400_1$-$400_N$ of power delivery system 450 is coupled to receive a zero signal output by the master device. Upon detection of an overshoot condition, the outputs of each of power modules $400_1$-$400_N$ are respectively shorted to ground, thus providing multiple paths for the excess load current $I_L$ to be drained. It should be noted that the load current $I_L$ is stored as excess charge on capacitor $C_F$, thus draining the excess load current $I_L$ is equivalent to draining the excess charge on capacitor $C_F$. When the excess charge on capacitor $C_F$ begins to drain through inductor $L_F$ (e.g. when the load voltage $V_L$ stops increasing), power modules $400_1$-$400_N$ exit overshoot conditions and resume normal power delivery operations to the load $R_L$.

Figure 15:
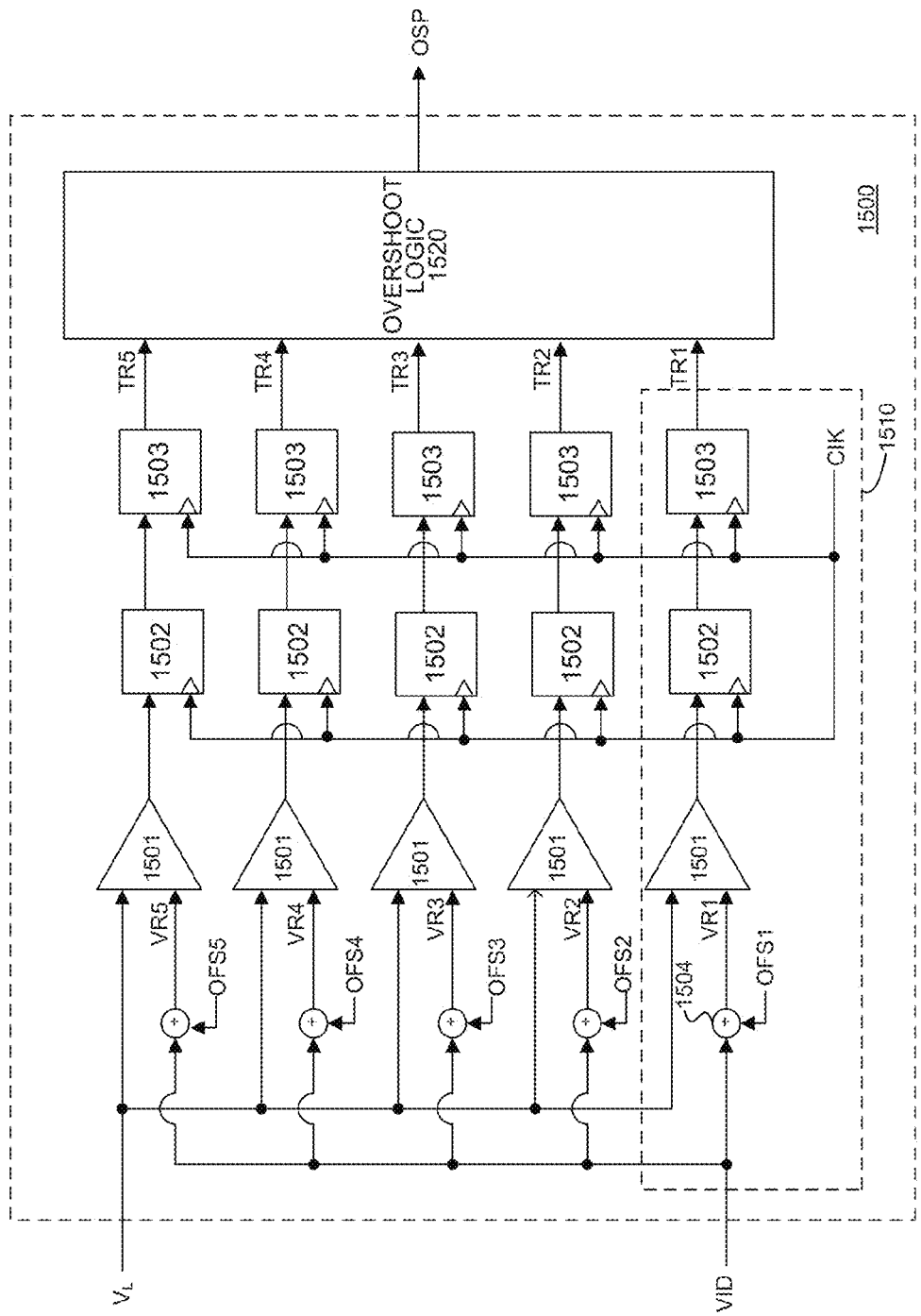
FIG. 15 illustrates an overshoot trip point circuit according to an embodiment.

FIG. 15 illustrates an overshoot trip point circuit 1500 according to an embodiment. Overshoot trip point circuit 1500 includes multiple trip point registers 1510, each comprising a comparator 1501 and flip-flops 1502 and 1503, and overshoot logic 1520. Each trip point register indicates when a load voltage ($V_L$) rises above or falls below a respective reference voltage (VR1-VR5). Reference voltages VR1-VR5 are generated by adding respective offset values (OFS1-OFS5) to a received set-point voltage (VID).

The first offset value OFS1 is chosen such that an overshoot condition is detected (preferably in the early stages) once the load voltage $V_L$ is greater than or equal to the respective reference voltage VR1 (i.e. when the $V_L$ curve rises to or surpasses VID by at least OFS1). Thus, OFS1 should be set beyond the response time of a PID controller, but not too high so as to incur severe overshoot. The reference voltages VR1-VR5 are provided to capture the peak voltage swing of $V_L$, thus indicating when the overshoot condition has been resolved. In an embodiment, the offset values OFS1-OFS5 are equally spaced apart. For example, OFS1, OFS2, OFS3, OFS4, and OFS5 may correspond to 75, 90, 105, 120, and 135 mV (millivolts), respectively. Thus, assuming VID is equal to 1.2V (volts), then the reference voltages VR1, VR2, VR3, VR4, and VR5 are equal to 1.075, 1.090, 1.105, 1.120, and 1.135V, respectively. In an embodiment, the offset values OFS1-OFS5 are predetermined values which have been tested to yield optimal results. In alternative embodiments, the spacing between the offset values OFS1-OFS5 may be programmable, such that each of OFS1-OFS5 is still equidistant from one another. In yet other embodiments, the offset values OFS1-OFS5 may be individually programmable, such that each of OFS1-OFS5 is arbitrarily spaced relative to one another. For the purposes of discussion five offset values OFS1-OFS5 are provided in the embodiment of FIG. 15, however it should be noted that any number of offset values may be used in alternative embodiments. For example, it may be desirable to use more reference voltages in order to narrow in on the exact point at which the load voltage $V_L$ peaks (i.e. when overshoot has been resolved). Alternatively, it may be desirable to use fewer reference voltages in the interest of saving die space.

The comparator 1501 compares the load voltage $V_L$ against a reference voltage (e.g. VR1) and either asserts or deasserts an output signal indicating whether $V_L$ is higher or lower than VR1. In an embodiment, the comparator 1501 asserts the output signal if $V_L$ is greater than or equal to VR1 and deasserts the output signal if $V_L$ is less than VR1. In an alternative embodiment, the comparator 1501 asserts the output signal only if $V_L$ is great than VR1 and deasserts the output signal if $V_L$ is less than or equal to VR1. Flip-flops 1502 and 1503 are provided for capturing the output signal of the comparator 1501 while reducing the chances for error due to metastability. Thus, an output signal from comparator 1501 is typically asserted (or deasserted) long enough to be captured by both flip-flops 1502 and 1503. In alternative embodiments, latches or other types of storage elements may be implemented in place of the flip-flops 1502 and 1503. The sampled output signal is provided to overshoot logic 1520 as a trigger signal (e.g. TR1). Overshoot logic 1520 then asserts or deasserts an overshoot protection signal (OSP), based on the trigger signals TR1-TR5, depending on when an overshoot condition is first detected, and when the overshoot condition has been resolved. The operation of overshoot logic 1520, according to an embodiment, is discussed in further detail below with respect to FIGS. 15 and 16.

Figure 16:
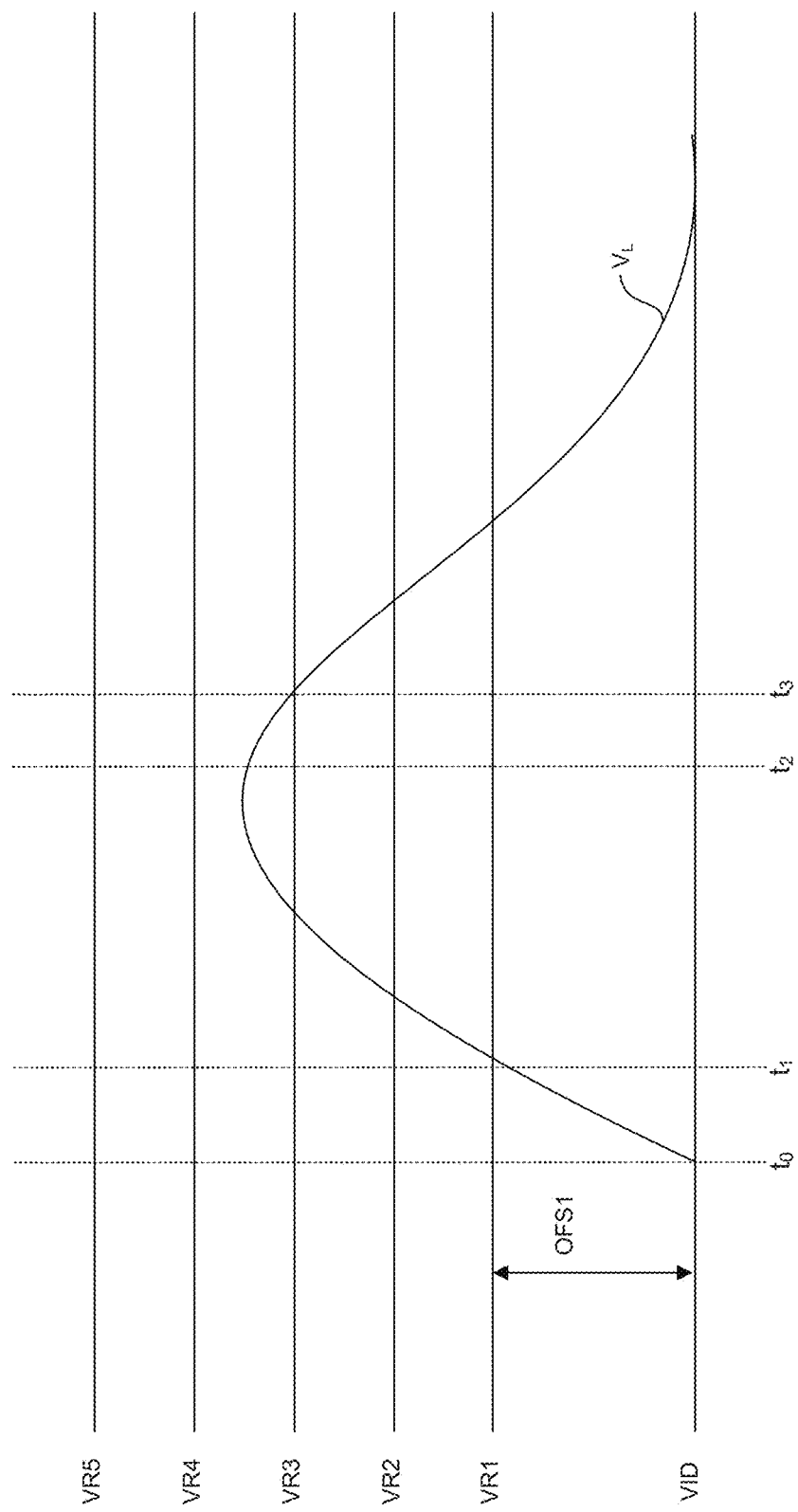
FIG. 16 illustrates an exemplary voltage profile according to an embodiment.
Figure 17:
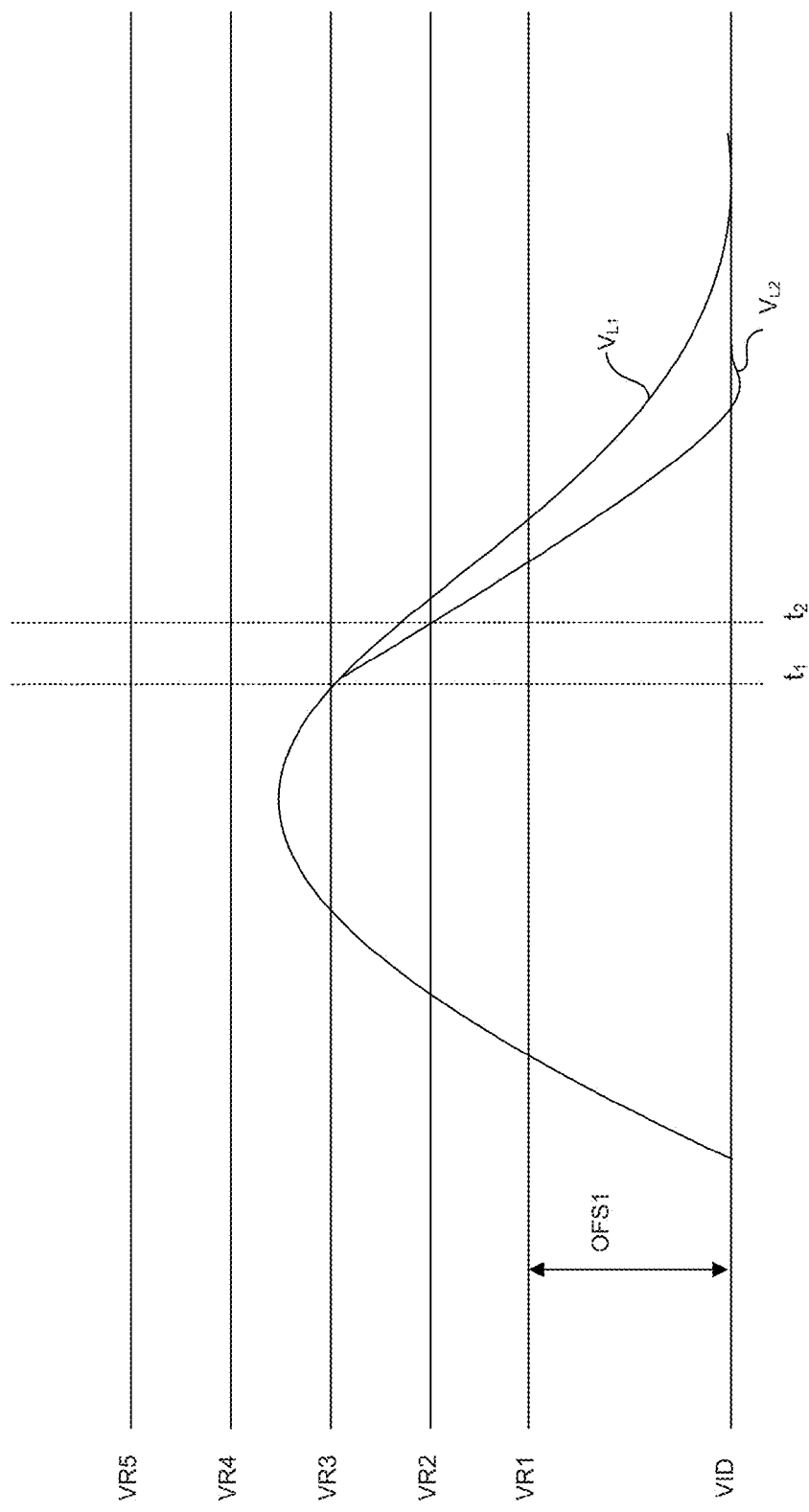
FIG. 17 illustrates an exemplary voltage profile according to another embodiment.

FIG. 16 illustrates a voltage profile according to an embodiment. The load voltage $V_L$ is shown in relation to the set-point voltage (VID) and the reference voltages (VR1-VR5). Under normal operating conditions, the load voltage $V_L$ should be constantly equal to (or at least relatively close to) the set-point voltage VID. At time $t_0$ the load voltage $V_L$, first begins to increase sharply. At time $t_1$ the load voltage $V_L$ is equal to the first reference voltage VR1, thus triggering the assertion of trigger signal TR1. In response, overshoot logic 1520 asserts the OSP signal which, in reference to FIG. 4, effectively cuts off power delivery to the load $R_L$ and enables the draining of excess load current $I_L$ from the system. At this point, the load voltage $V_L$ continues to rise for a time after the power delivery is cut off, since the load current $I_L$ cannot change instantaneously through inductor $L_F$. The load voltage level $V_L$, rises past reference voltage levels VR2 and VR3, thus triggering the assertion of respective trigger signals TR2 and TR3, before reaching a peak at time $t_2$. At time t3 the level of the load voltage $V_L$ falls to the level of reference voltage VR3, thus triggering the deassertion of trigger signal TR3. Overshoot logic 1520 detects the deassertion of trigger signal TR3 from being in an asserted state (i.e. a high-to-low transition of TR3), and responds by deasserting the OSP signal. At this time normal power delivery operation is resumed, and control of the voltage $V_L$ is returned to the PID controller. It should be noted that any number if trigger signals TR1-TR5 may be asserted as the load voltage level $V_L$ rises, thus overshoot logic 1520 will deassert the OSP signal in response to the first high-to-low transition it detects among any of the trigger signals TR1-TR5. In alternative embodiments, overshoot logic 1520 may deasssert the OSP signal after detecting a certain number of high-to-low transitions. For example, in reference to the voltage profile of $V_L 2$ of FIG. 17, it may be desirable to wait until the load voltage level $V_L 2$ drops to the level of reference voltage VR2 (at time $t_2$) before deasserting the OSP signal, thus reducing the time it takes the load voltage level $V_L 2$ to return to the set-point voltage level VID.

Current Estimation Circuitry

Figure 18:
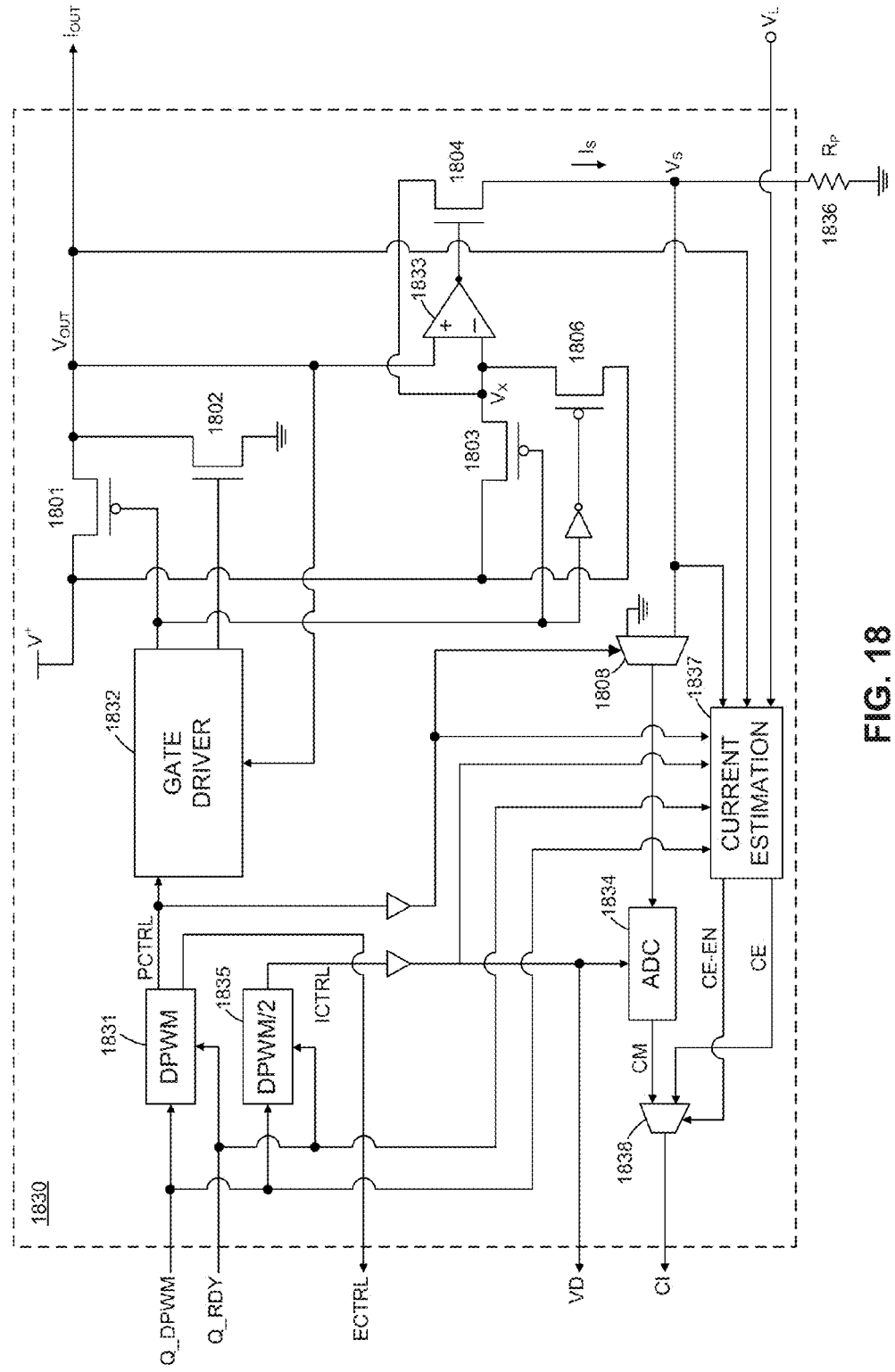
FIG. 18 illustrates a power stage according to another embodiment.

FIG. 18 illustrates a power stage 1830 according to another embodiment. Power stage 1830 includes a first DPWM decoder 1831, a gate driver 1832, an operational amplifier 1833, an analog-to-digital converter (ADC) 1834, a second DPWM decoder 1835, current estimation circuit 1837, and a multiplexer 1838. With the exception of current estimation circuit 1837 and the multiplexer 1838, it is assumed, for the purposes of discussion, that each of the circuit elements of power stage 1830 function similarly to their counterparts in power stage 1330, as discussed above in reference to FIG. 13. The current estimation circuit 1837 is provided for generating current information (CI) in certain instances where the standard current measurement circuitry (comprising operational amplifier 1833 and ADC 1834) may not be relied upon to produce accurate current information. For example, the settling time of the operational amplifier 1833 limits the rate at which a sample current $I_S$ may be accurately generated (e.g. within a certain tolerance threshold). Accordingly, if the ADC 1834 were to stop sampling (i.e. hold a sample of) the sample voltage $V_S$ before an accurate sample current $I_S$ is generated, doing so could produce an inaccurate current measurement (CM) value. Thus, an ICTRL signal having a pulse width that is shorter than the settling time of the operational amplifier 1833 may cause inaccuracies in the measured current information. An operation of power stage 1830 is discussed in further detail below in reference to FIG. 19.

Figure 19:
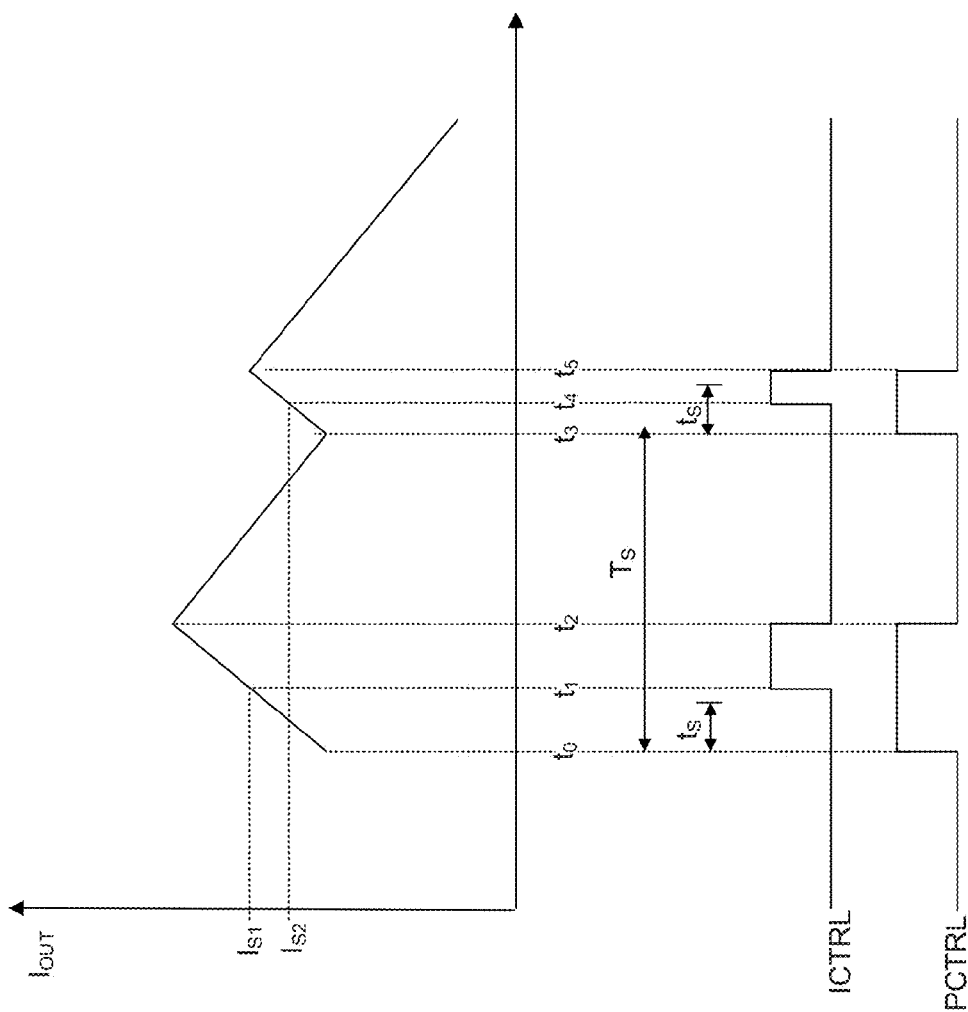
FIG. 19 illustrates an exemplary current response curve according to an embodiment.

FIG. 19 illustrates an exemplary current response curve according to an embodiment. The switching period of the PCTRL signal (e.g. the time between rising edges of the PCTRL signal) is denoted $T_S$, and the settling time of the operational amplifier 1833 is denoted $\tau_S$. Between $t_0$ and $t_2$ the output current $I_{out}$ rises as the PCTRL signal is asserted high. The assertion of the ICTRL signal at $t_1$ triggers ADC 1834 to generate a current measurement value representing a first sample current $I_{S1}$. The output current $I_{out}$ then falls between $t_2$ and $t_3$ as the PCTRL signal is no longer asserted high. Between $t_3$ and $t_5$ the assertion of the PCTRL signal once again causes the output current $I_{out}$ to rise, however the duty cycle of the PCTRL signal during this switching period is significantly less than that of the previous switching period. The assertion of the ICTRL signal at $t_4$ (which always has a duty cycle that is half that of the PCTRL signal) triggers the ADC 1834 to generate a current measurement value representing a second sample current $I_{S2}$. However, in this case the ICTRL signal is asserted before the operational amplifier 1833 can settle on an accurate sample current $I_S$ (e.g. the duration between $t_3$ and $t_4$ is shorter than the settling time $\tau_S$ of the operational amplifier 1833), thus the second sample current $I_{S2}$, generated by the ADC 1834, may not accurately reflect the actual output current $I_{out}$. Still referring to FIG. 19, it can be seen that the current response curve of the output current $I_{out}$ is relatively linear. Thus, if an accurate sample current $I_S$ is known at time $t_3$, a second sample current $I_{S2}$ may be generated at time $t_4$ by means of linear extrapolation. This is described in further detail below in reference to FIG. 20.

Figure 20:
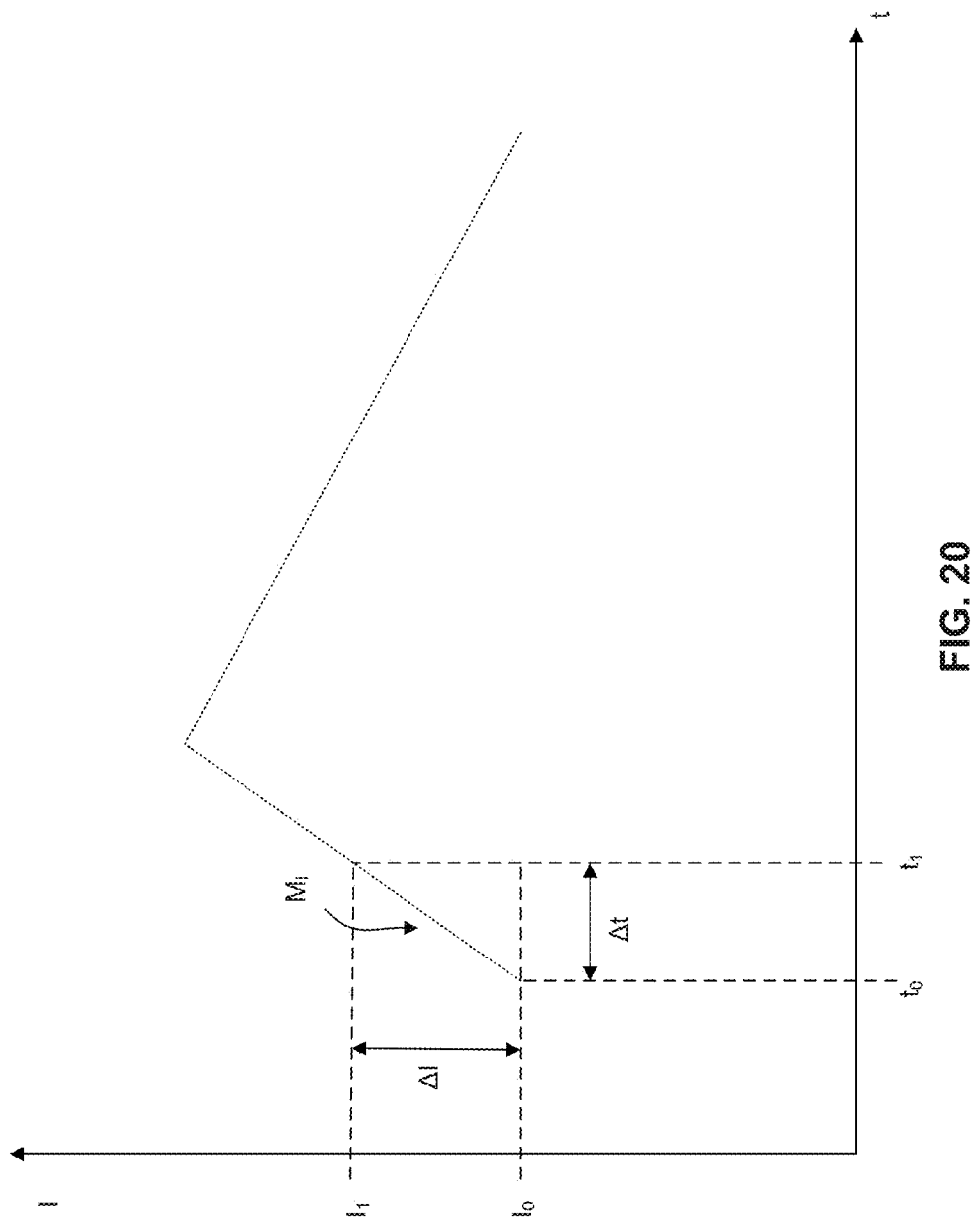
FIG. 20 illustrates an exemplary current response curve according to another embodiment.

FIG. 20 illustrates an exemplary current response curve according to another embodiment. From here it is clear that the value of the current $I_1$ can be deduced from the equation: $I_1=I_0+m_1*(t_1-t_0)$, which can also be represented as $\Delta I=m_1*\Delta t$. The value of $I_0$ can be (accurately) measured, and the values of $t_1$ and $t_0$ may be derived from the duty cycle information carried on the DPWM signals. In reference to FIG. 4, the current output by power module 400$_1$ is provided to the inductor $L_F$, thus the output current $I_{out}$ is equivalent to the current through the inductor $L_F$. The current through the inductor $L_F$ follows the equation: $dI/dt=V_{LF}(t)/L_F$, which can be rewritten as $\Delta I=\Delta t=V_{LF}/L_F$, since the current response is linear. This equation can further be presented in the form: $\Delta I=V_{LF}/L_F*\Delta t$, which when equated with the previous equation ($\Delta I=m_1*\Delta t$), shows how the slope $m_1$ of the current response curve is derived. In other words, $m_1=V_{LF}/L_F$. $V_{LF}$ is the voltage drop across the inductor $L_F$, which is simply the difference between the output voltage of power module 400$_1$ and the voltage across the load (i.e. $V_{LF}=V_{out}-V_L$). Thus, the value of $I_1$ can be linearly extrapolated based on values that are either predetermined or can be accurately measured ($I_1=I_0+[V_{out}-V_L]/L_F*[t_1-t_0]$).

Figure 21:
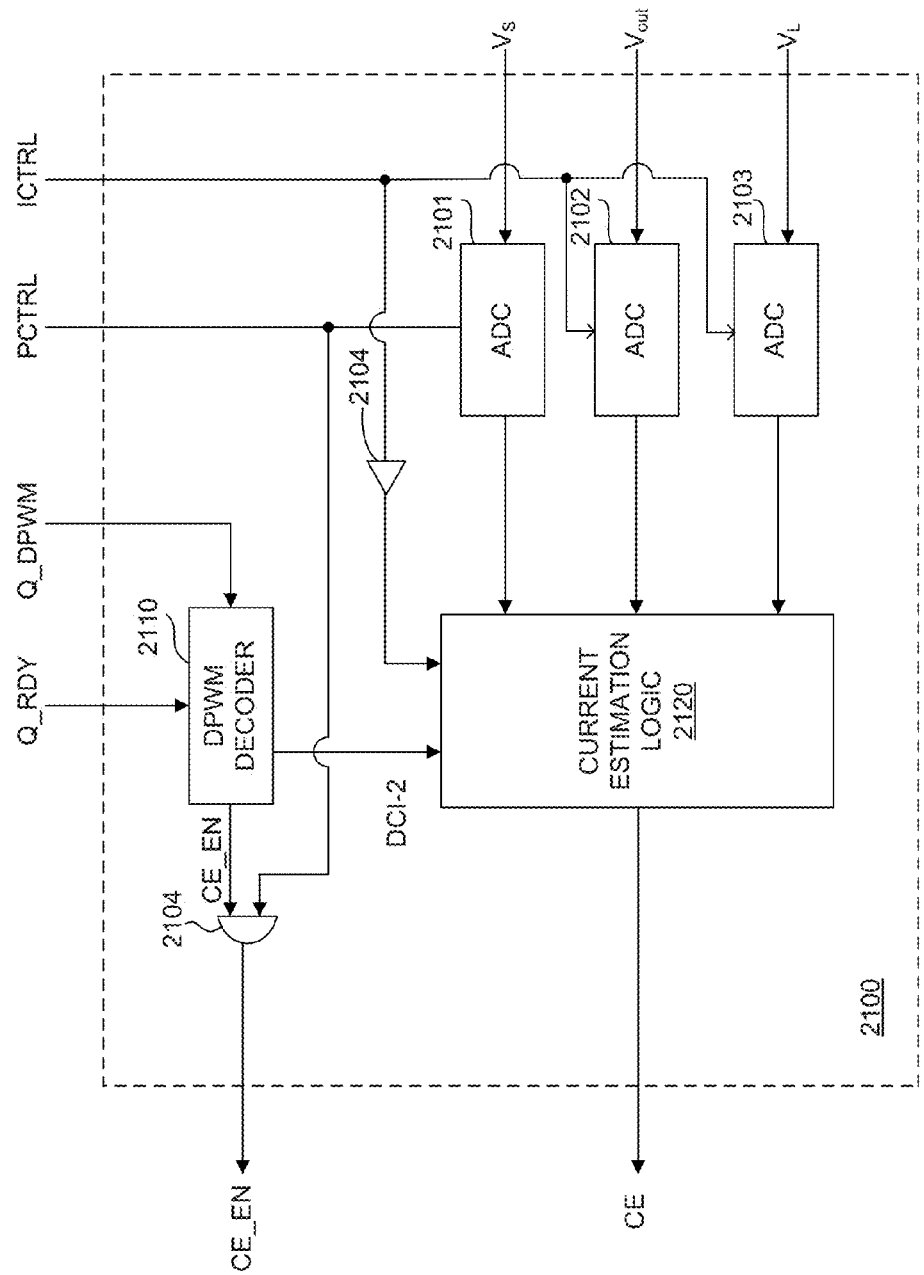
FIG. 21 illustrates a current estimation circuit according to an embodiment.

FIG. 21 illustrates a current estimation circuit 2100 according to an embodiment. Current estimation circuit 2100 includes a DPWM decoder 2110 and current estimation logic 2120. The DPWM decoder 2110 is coupled to receive a Q_DPWM signal and, in response to a Q_RDY signal, decodes respective duty cycle information encoded on the Q_DPWM signal. In reference FIG. 18, the DPWM decoder 2110 then determines, based on the decoded duty cycle information, whether a current estimation (CE) value should be provided as the current information output from power stage 1830 and asserts (or deasserts) a CE_EN signal accordingly. The CE_EN signal is provided as a select input to the multiplexer 1838, thus selecting either a current measurement (CM) value from ADC 1834 or a CE value from current estimation circuit 1837 to be output as a current information (CI) value. In an embodiment, the CE_EN signal is gated by a PCTRL signal within logic gate 2104, such that CE_EN may be asserted at the select input of the multiplexer 1838 for only the duration that a PCTRL signal is also asserted. In an embodiment, the logic gate 2104 is a logic AND gate. The DPWM decoder 2110 additionally provides a DCI_2 value to current estimation logic 2120, which represents a duty cycle that is half that of the duty cycle decoded from the Q_DPWM signal. An operation of the DPWM decoder 2110 is herein discussed in further detail with respect to FIG. 22.

Figure 22:
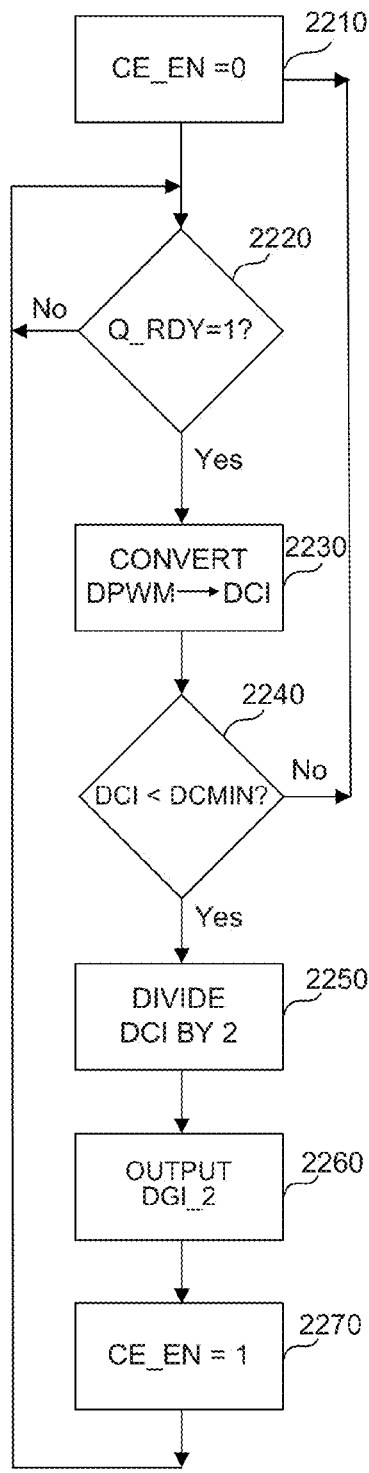
FIG. 22 illustrates an operation of a current estimation circuit according to an embodiment.

FIG. 22 illustrates an operation within the DPWM decoder 2110 according to an embodiment. The CE_EN signal is initially deasserted at 2210. At 2220, the DPWM decoder 2110 checks if Q_RDY is asserted. If Q_RDY deasserted, DPWM decoder 2110 will continue to repeat step 2220 until Q_RDY is asserted. After detecting an asserted Q_RDY signal, duty cycle information (DCI) is decoded from a respective Q_DPWM signal at 2330. For example, the DCI value may represent a percentage of the switching period $T_S$ of a PCTRL signal (e.g. 10% of $T_S$). In alternative embodiments, the duty cycle information may be measured based on the pulse width of an analog PWM signal (e.g. the PCTRL signal). At 2240, the DCI value is compared against a minimum duty cycle (DCMIN). For example, in reference to FIG. 18, the value of DCMIN may reflect the settling time $\tau_S$ of the operational amplifier 1833. In other words, the DCMIN value may represent a percentage of the switching period $T_S$ having a duration equal to that of the settling time $\tau_S$. Thus if the DCI value is less than the value of DCMIN, operation of DPWM decoder 2110 advances to step 2250, otherwise the DPWM decoder 2110 returns to step 2210 thus deasserting the CE_EN signal. In alternative embodiments, the DPWM decoder 2110 may proceed to step 2250 if the DCI value is less than or equal to the value of DCMIN. At 2250, the DCI value is divided by two in order to produce a half-duty cycle value DCI_2. The DCI_2 value is output form the DPWM decoder at 2260, followed by an assertion of the CE_EN signal at 2270. Finally, the DPWM decoder 2110 returns to step 2220 and awaits a subsequent assertion of the Q_RDY signal.

Referring back to FIG. 21, current estimation logic 2120 is coupled to receive the DCI_2 value from the DPWM decoder 2110 along with the voltages $V_S$, $V_{out}$, $V_L$. In an embodiment, the sample voltage $V_S$ is sampled and stored in ADC 2101 in response to a PCTRL signal, and the voltages $V_{out}$ and $V_L$ are sampled and stored in ADCs 2102 and 2103, respectively, in response to an ICTRL signal. Thus, each of ADCs 2101-2103 may be, for example, sample-and-hold ADCs for converting respective analog voltages into digital signals which may then be processed by the current estimation logic 2120. In alternative embodiments, the load voltage $V_L$ may be predetermined and encoded (i.e. stored) within the current estimation logic 2120 prior to initialization, thus bypassing the need for ADC 2103. For example, $V_L$ may be estimated by the set-point voltage VID, since it is assumed that the load voltage $V_L$ should generally remain at or near the set-point voltage VID. The current estimation logic 2120, in response to the ICTRL signal, generates a current estimation (CE) value based on the value of DCI_2 and the received voltages $V_S$, $V_{out}$, and $V_L$. In some embodiments, a delay element 2104 may be provided along the ICTRL signal path to provide the ADCs 2102 and 2103 enough time to settle on an accurate sampling of the voltages $V^+$ and $V_{out}$, respectively, before the current estimation logic 2120 computes a CE value. An operation of the current estimation logic 2120 is herein discussed in further detail with respect to FIG. 23.

Figure 23:
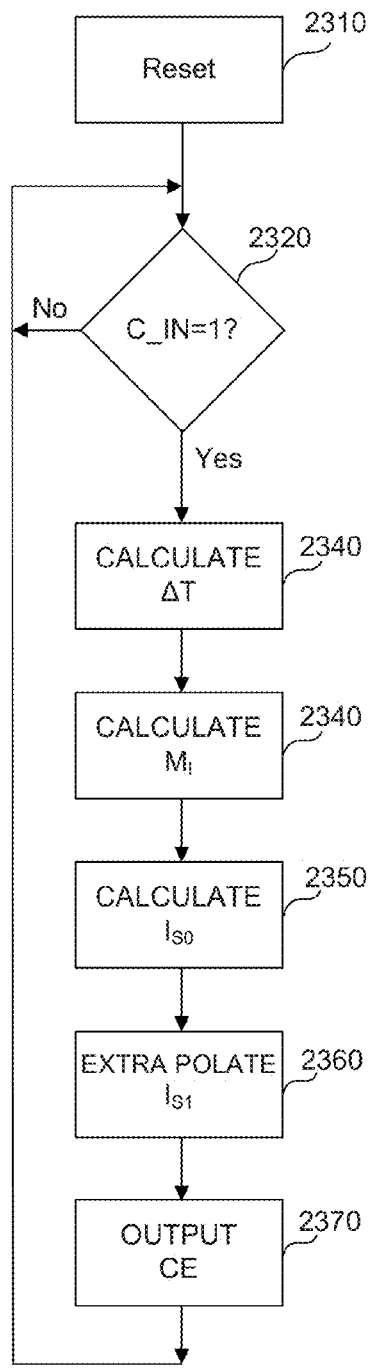
FIG. 23 illustrates an operation of a current estimation circuit according to another embodiment.

FIG. 23 illustrates an operation within the current estimation logic 2120 according to an embodiment. At step 2310, the current estimation logic 2120 is reset (e.g. any intermediate values stored within the current estimation logic 2120 are reset to their default values during initialization). The current estimation logic 2120 then proceeds to detect an assertion of an ICTRL signal at 2320, and repeats this step until ICTRL is asserted. At 2330, upon detecting an asserted ICTRL signal, the current estimation logic 2120 calculates a change in time ($\Delta T$), based on a value of DCI_2, representative of a pulse width of an ICTRL signal. For example, if DCI_2 corresponds to a duty cycle of 5%, then $\Delta T=0.05*T_S$. At 2340, a slope ($m_1$) is calculated based on received values of $V_L$ and $V_{out}$, and an inductance of the inductor $L_F$, which may be preconfigured within the current estimation logic 2120. For example, as discussed above in reference to FIG. 20, the slope $m_1$ may be calculated according to the equation: $m_1=(V_{out}-V_L)/L_F$. Then at step 2350, an initial sample current ($I_{S0}$) value is calculated based on a received sample voltage $V_S$ and the resistance of an external precision resistor R. For example, the initial sample current $I_{S0}$ may be derived from the equation: $I_{S0}=V_S/R_P$. Finally, at step 2360, a final sample current (IS1) value is extrapolated based on the calculations of the change in time $\Delta T$, the slope $m_1$ and the initial sample current $I_{S0}$. For example, as discussed above in reference to FIGS. 19 and 20, the final sample current $I_{S1}$ may be calculated from the equation: $I_{S1}=I_{S0}+m_1*\Delta T$. And at 2370, the value of the final sample current $I_S$ is output from the current estimation logic 2120 as a current estimation (CE) value.

In the aforementioned embodiments, the current estimation circuit 1837 (FIG. 18) has been disclosed as being selectively coupled to a multiplexer 1838, such that the ADC 1834 provides the primary source of current information (e.g. CM values) and the current estimation circuit 1837 provides as a secondary source of current information (e.g. CE values). However, it should be noted that in alternative embodiments, the multiplexer 1838 may be eliminated and the current estimation circuit 1837 may replace the ADC 1834 as the sole provider of current information (i.e. the power stage 1830 only outputs CE values). In yet other embodiments, the current estimation circuit 1837 may not be coupled to receive the sample voltage $V_S$, and instead extrapolate all values of $V_S$ (e.g. beginning with an initial value of $V_S=0V$), thus precluding the need for any circuit elements pertaining to current measurement (e.g. operational amplifier 1833; transistors 1803, 1804, and 1806; precision resistor 1836; and multiplexer 1808).

Figure 24:
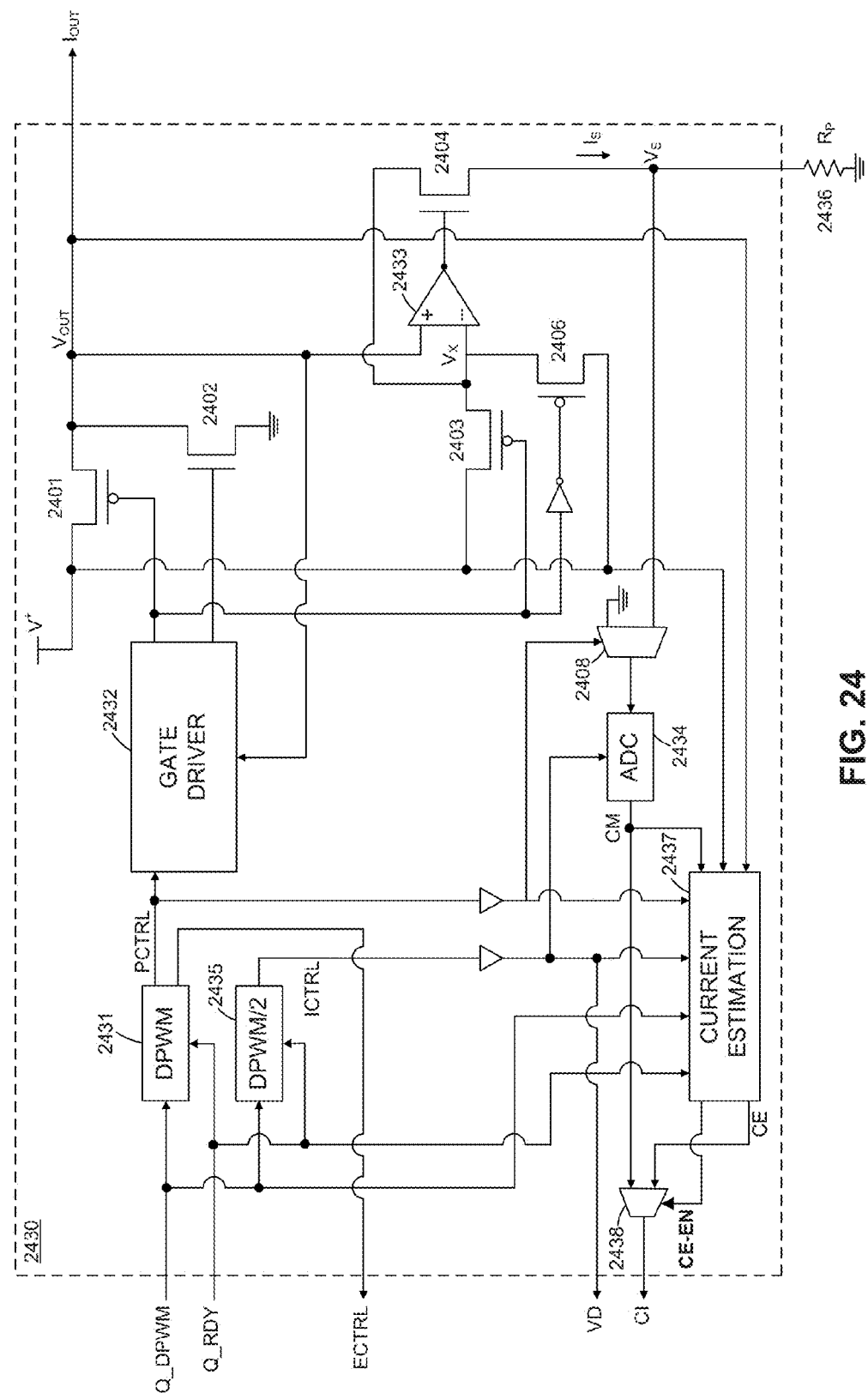
FIG. 24 illustrates a power module according to yet another embodiment.

FIG. 24 illustrates a power stage 2430 according to yet another embodiment. Power stage 2430 includes a first DPWM decoder 2431, a gate driver 2432, an operational amplifier 2433, an analog-to-digital converter (ADC) 2434, a second DPWM decoder 2435, current estimation circuit 2437, and a multiplexer 2438. With the exception of current estimation circuit 2437, it is assumed, for the purposes of discussion, that each of the circuit elements of power stage 2430 function similarly to their counterparts in power stage 1830, as discussed above in reference to FIG. 18. The current estimation circuit 2437 is provided as an alternative means for generating current information (CI) in instances where the standard current measurement circuitry (comprising operational amplifier 2433 and ADC 2434) may not be relied upon to produce accurate current information, as discussed above in reference to FIG. 18.

Figure 25:
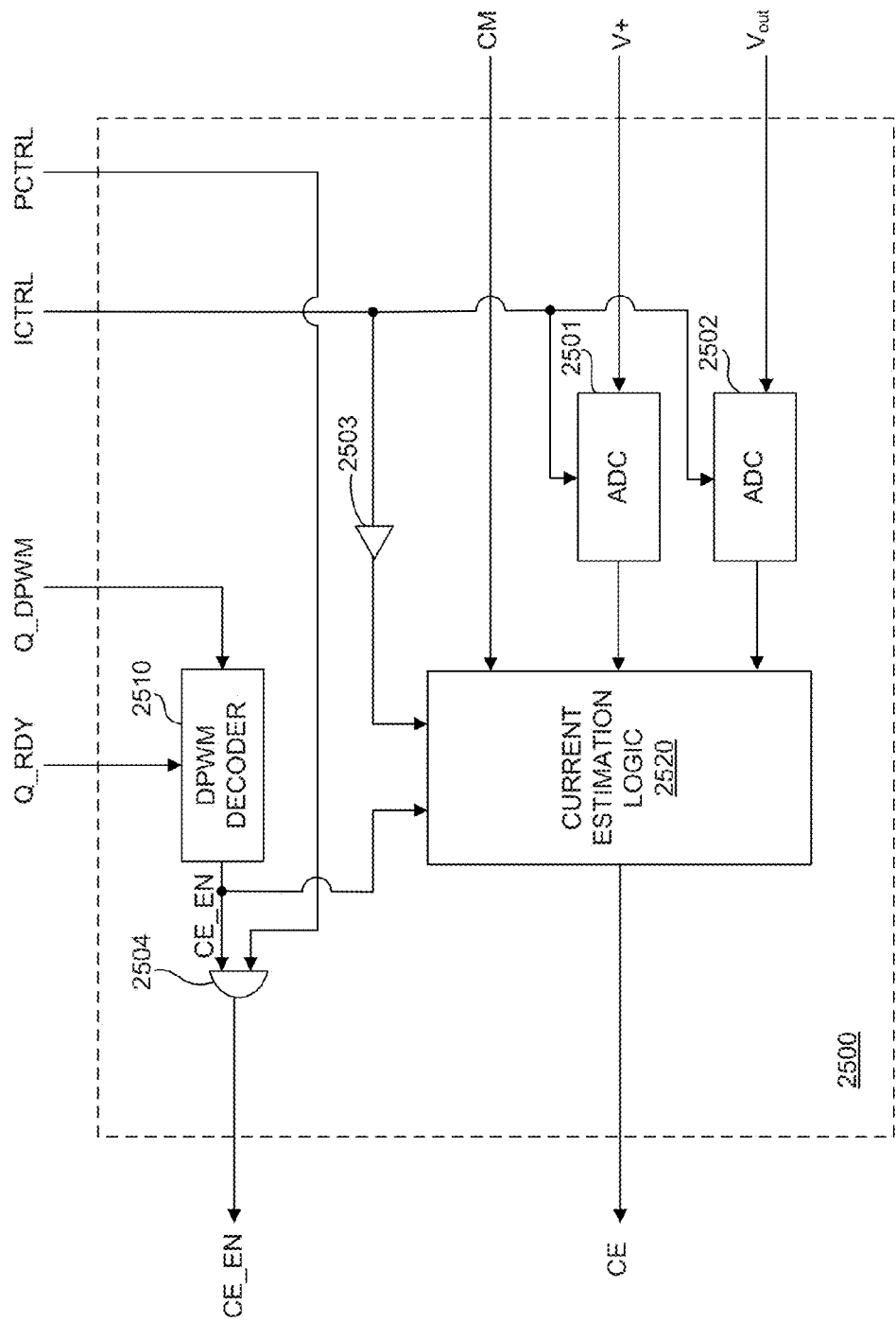
FIG. 25 illustrates a current estimation circuit according to another embodiment.

FIG. 25 illustrates a current estimation circuit 2500 according to another embodiment. Current estimation circuit 2500 includes a DPWM decoder 2510 and current estimation logic 2520. The DPWM decoder 2510 is coupled to receive a Q_DPWM signal and, in response to a Q_RDY signal, decodes respective duty cycle information encoded on the Q_DPWM signal. In reference FIG. 24, the DPWM decoder 2510 then determines, based on the decoded duty cycle information, whether a current estimation (CE) value should be provided as the current information output from power stage 2430 and asserts (or deasserts) a CE_EN signal accordingly. The CE_EN signal is provided to the current estimation logic 2520 and as a select input to the multiplexer 2438, thus selecting either a current measurement (CM) value from ADC 2434 or a CE value from current estimation circuit 2437 to be output as a current information (CI) value. In an embodiment, the CE_EN signal is gated by a PCTRL signal within logic gate 2504, such that CE_EN may be asserted at the select input of the multiplexer 1838 for only the duration that a PCTRL signal is also asserted. In an embodiment, the logic gate 2504 is a logic AND gate. Upon detecting an asserted Q_RDY signal, the DPWM decoder 2510 compares duty cycle information represented on a respective Q_DPWM signal against a minimum duty cycle. For example, in reference to FIG. 24, the minimum duty cycle may reflect a settling time $\tau_S$ of the operational amplifier 2433. If the duty cycle information is less than the minimum duty cycle DPWM decoder 2510 asserts the CE_EN signal, otherwise the CE_EN signal is deasserted (or remains deasserted). In alternative embodiments, the DPWM decoder 2110 may assert the CE_EN signal if the duty cycle information is less than or equal to the minimum duty cycle.

Current estimation logic 2520 is coupled to receive a current measurement (CM) value, along with the supply voltage $V^+$ and the output voltage $V_{out}$. In an embodiment, the supply voltage $V^+$ and the output voltage $V_{out}$ are sampled and stored in ADCs 2501 and 2502, respectively, in response to an ICTRL signal. Thus, each of ADCs 2501 and 2502 may be, for example, sample-and-hold ADCs for converting respective analog voltages into digital signals which may then be processed by the current estimation logic 2520. In alternative embodiments, the supply voltage $V^+$ may be predetermined and encoded (i.e. stored) within the current estimation logic 2520 prior to initialization, thus bypassing the need for ADC 2501. For example, because $V^+$ is the supply voltage, it should be a known value which can be assumed to remain relatively stable. Referring back to FIG. 24, each time the ICTRL signal is asserted and the CE_EN signal is deasserted, current estimation logic 2520 responds by computing a drain-to-source resistance $R_{DS}$ across the PMOS transistor 2401 based on the CM value and the voltages $V^+$ and $V_{out}$. For example, the output current $I_{out}$ can be derived from the CM value, having knowledge of the precision resistor $R_P$ and the scaling factor N of the PMOS transistor 2403. From there, the resistance $R_{DS}$ can be derived from the equation: $R_{DS}=V^+-V_{out})/I_{out}$. In an embodiment, only one (e.g. the most recent) $R_{DS}$ value is stored within current estimation logic 2520 at a time. In alternative embodiments, multiple $R_{DS}$ values may be stored within current estimation logic 2520. In yet other embodiments, the current estimation logic 2520 may keep a running average of the $R_{DS}$ values. This may be desirable in situations where the resistance $R_{DS}$ fluctuates often (e.g. due to external factors such as temperature). In certain embodiments, an initial $R_{DS}$ value may be stored within current estimation logic 2520 prior to initialization. Upon receiving both an asserted ICTRL signal and an asserted CE_EN signal, current estimation logic 2520 responds by computing a current estimation (CE) value based on a stored value of $R_{DS}$ and the received voltages $V^+$ and $V_{out}$. For example, the output current $I_{out}$ may be derived from the equation: $I_{out}=(V^+-V_{out}/R_{DS}$. In an embodiment, the value of the derived output current $I_{out}$ may be directly provided as the CE value. In alternative embodiments, the output current $I_{out}$ may be scaled (e.g. by a factor of N) before being output as the CE value, thus maintaining consistency with the scaled CM values. In same embodiments, a delay element 2503 may be provided along the ICTRL signal path to provide the ADCs 2501 and 2502 enough time to settle on an accurate sampling of the voltages $V^+$ and $V_{out}$, respectively, before the current estimation logic 2520 computes a CE value.

It should be noted that the current estimation circuit 2500 embodiment of FIG. 25 is especially advantageous when switching between DPWM signals with smaller duty cycles and DPWM signals with larger duty cycles. For example, in reference to FIG. 24, it is possible that a DPWM signal may carry a very small duty cycle such that the duration of a resulting PCTRL signal pulse is less than a settling time of the operational amplifier 2433. As a result, it may be very difficult to obtain an accurate measurement of the sample voltage $V_S$ that is generated in response to such a short PCTRL pulse and thus render an inaccurate measurement of the output current $I_{out}$, based on the sample voltage $V_S$. Thus, for shorter duty cycles, the current estimation circuit 2500 dynamically estimates the output current $I_{out}$ based solely on a previously stored CM value (during an operation having larger duty cycles), and a current sample of the received voltages $V^+$ and $V_{out}$. When receiving DPWM signals with larger duty cycles, the current estimation 2500 will refrain from generating the CE values and deassert the CE_EN signal, thus allowing the CM value generated by the ADC 2434 to be provided as the current information CI.

Figure 26:
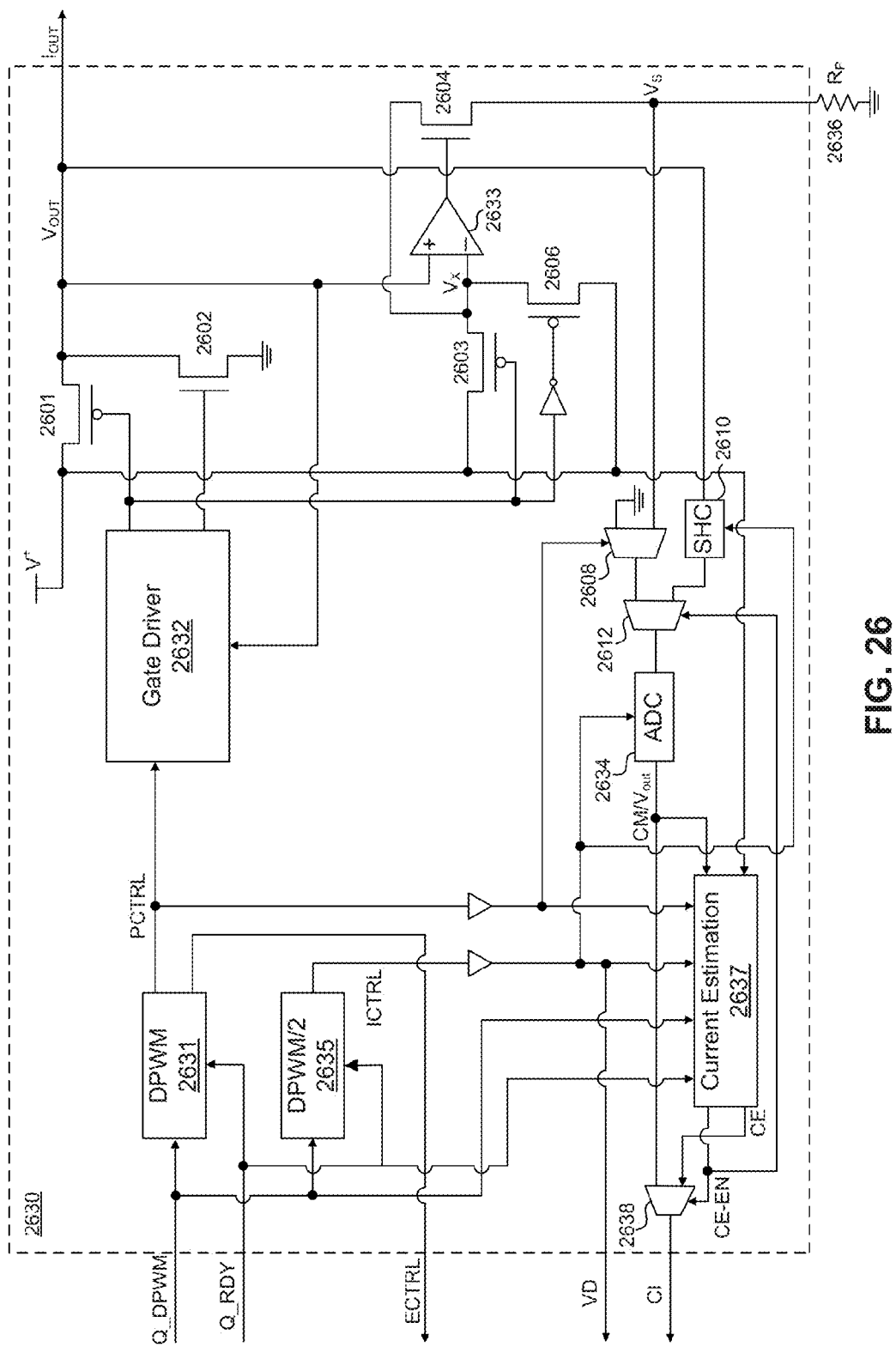
FIG. 26 illustrates a power module according to another embodiment.

FIG. 26 illustrates a power stage 2630 according to another embodiment. Power stage 2630 includes a first DPWM decoder 2631, a gate driver 2632, an operational amplifier 2633, an analog-to-digital converter (ADC) 2634, a second DPWM decoder 2635, current estimation circuit 2637, a sample-and-hold circuit (SHC) 2610, and multiplexers 2638 and 2612. With the exception of SHC 2610 and multiplexer 2612, it is assumed, for the purposes of discussion, that each of the circuit elements of power stage 2630 function similarly to their counterparts in power stage 2430, as discussed above in reference to FIG. 24. Power stage 2630 leverages the ADC 2634 used to sample the sample voltage $V_S$, and thus utilizes the same ADC 2634 for sampling the output voltage $V_{out}$. In other words, rather than provide the output voltage $V_{out}$ to an additional ADC (located within the current estimation circuit 2637), it is instead provided to the existing ADC 2634 to be sampled during an interval when the sample voltage $V_S$ need not be sampled. For example, as discussed in reference to FIG. 25, the current estimation circuit 2637 need only receive sample values of the output current $I_{out}$ (e.g., $V_S$ or $I_S$), for calculating $R_{DS}$ values, for larger DPWM duty cycles. During such period, the output voltage $V_{out}$ may be sampled and held by the SHC 2610 in response to an ICTRL signal. The SHC 2610 may be, for example, a latch or a flip-flop or other storage circuit. Accordingly, when the current estimation circuit 2637 detects a significant drop in the DPWM duty cycles (e.g., below a threshold value), it assumes the role of outputting the current information CI and asserts the CE_EN signal. According to an embodiment, the CE_EN signal is provided to the multiplexer 2612, thus selecting the $V_{out}$ value stored in the SHC 2610 for output to the ADC 2634. Thus, the ADC 2634 outputs either a CM value or a sampled $V_{out}$ value, depending on a size of the duty cycle signaled on the DPWM signal.

Figure 27:
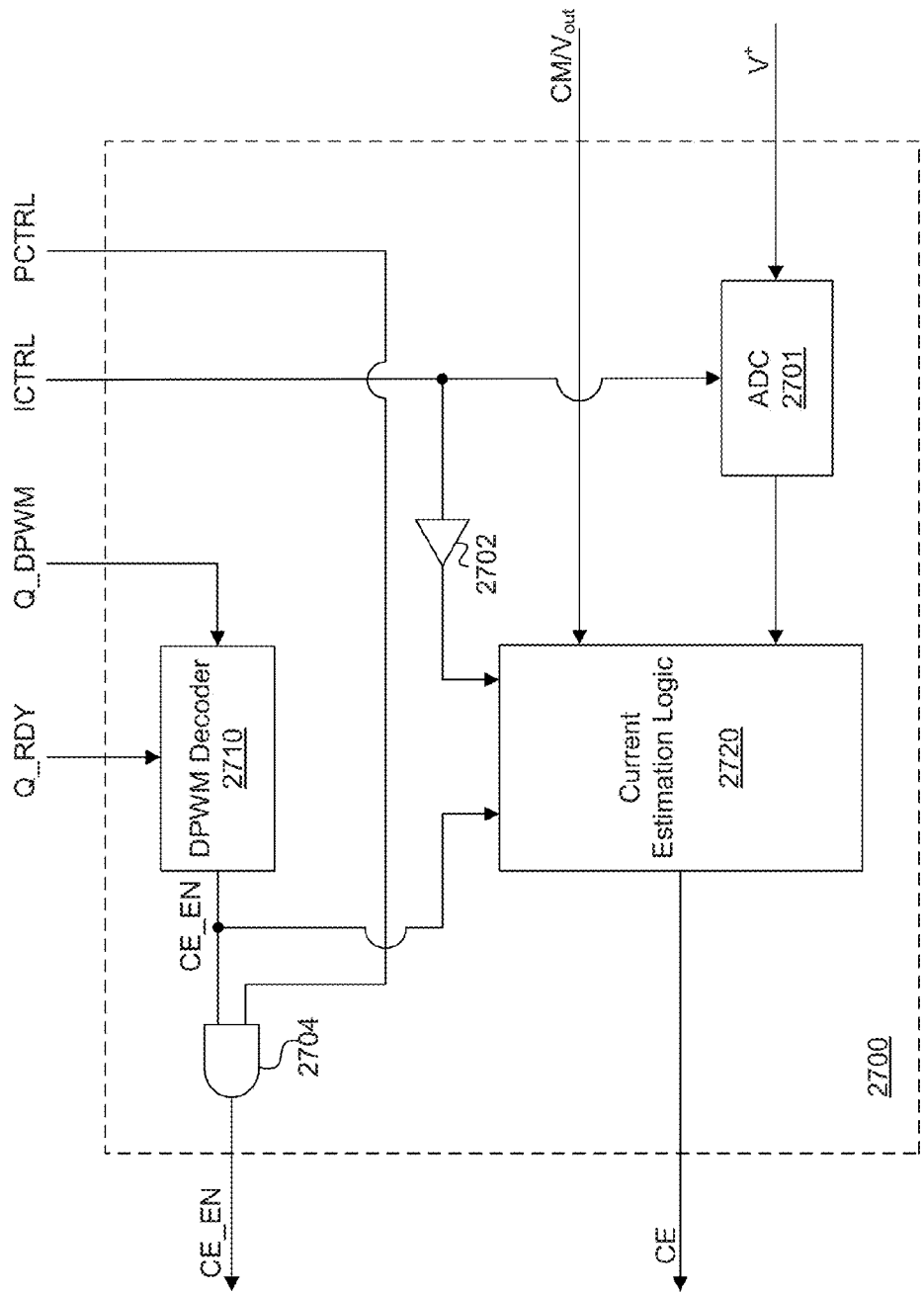
FIG. 27 illustrates a current estimation circuit according to another embodiment.

FIG. 27 illustrates a current estimation circuit 2700 according to another embodiment. Current estimation circuit 2500 includes a DPWM decoder 2710 and current estimation logic 2720. Furthermore, it should be noted that the current estimation circuit 2700 includes only a single ADC 2701. It is assumed, for purposes of discussion, that each of the circuit elements of current estimation circuit 2700 function similarly to their counterparts in current estimation circuit 2500, as discussed above in reference to FIG. 25. However, rather than receive two separate CM and $V_{out}$ signals, the current estimation logic 2720 receives only a single CM/$V_{out}$ signal. For example, as discussed above in reference FIG. 26, the current estimation logic 2720 receives CM values, via the CM/$V_{out}$ signal line, for larger DPWM duty cycles, $V_{out}$ values for smaller DPWM duty cycles. In an embodiment, the current estimation logic 2720 determines how to interpret the received CM/$V_{out}$ signal based on whether or not the CE_EN signal is asserted. For example, when the CE_EN signal is deasserted the current estimation logic 2720 interprets the CM/$V_{out}$ values as current measurement CM values, and generates respective $R_{DS}$ samples. When the CE_EN signal is asserted, the current estimation logic interprets the CM/$V_{out}$ values as $V_{out}$ values, and generates respective current estimation CE samples. In alternative embodiments, the supply voltage may be predetermined and encoded (i.e. stored) within the current estimation logic 2720 prior to initialization, thus bypassing the need for ADC 2701. For example, because $V^+$ is the supply voltage, it should be a known value which can be assumed to remain relatively stable.

It should be noted that the various integrated circuits, dice and packages disclosed herein may be described using computer aided design tools and expressed (or represented), as data and/or instructions embodied in various computer-readable media, in terms of their behavioral, register transfer, logic component, transistor, layout geometries, and/or other characteristics. Formats of files and other objects in which such circuit expressions may be implemented include, but are not limited to, formats supporting behavioral languages such as C, Verilog, and VHDL, formats supporting register level description languages like RTL, and formats supporting geometry description languages such as GDSII, GDSIII, GDSIV, CIF, MEBES and any other suitable formats and languages. Computer-readable media in which such formatted data and/or instructions may be embodied include, but are not limited to, non-volatile storage media in various forms (e.g., optical, magnetic or semiconductor storage media) and carrier waves that may be used to transfer such formatted data and/or instructions through wireless, optical, or wired signaling media or any combination thereof. Examples of transfers of such formatted data and/or instructions by carrier waves include, but are not limited to, transfers (uploads, downloads, e-mail, etc.) over the Internet and/or other computer networks via one or more data transfer protocols (e.g., HTTP, FTP, SMTP, etc.).

When received within a computer system via one or more computer-readable media, such data and/or instruction-based expressions of the above described circuits may be processed by a processing entity (e.g., one or more processors) within the computer system in conjunction with execution of one or more other computer programs including, without limitation, net-list generation programs, place and route programs and the like, to generate a representation or image of a physical manifestation of such circuits. Such representation or image may thereafter be used in device fabrication, for example, by enabling generation of one or more masks that are used to form various components of the circuits in a device fabrication process.

In the foregoing description and in the accompanying drawings, specific terminology and drawing symbols have been set forth to provide a thorough understanding of the present invention. In some instances, the terminology and symbols may imply specific details that are not required to practice the invention. For example, any of the specific numbers of bits, signal path widths, signaling or operating frequencies, component circuits or devices and the like may be different from those described above in alternative embodiments. In other instances, well-known circuits and devices are shown in block diagram form to avoid obscuring the present invention unnecessarily. Additionally, the interconnection between circuit elements or blocks may be shown as buses or as single signal lines. Each of the buses may alternatively be a single signal line, and each of the single signal lines may alternatively be buses. Signals and signaling paths shown or described as being single-ended may also be differential, and vice-versa. Similarly, signals described or depicted as having active-high or active-low logic levels may have opposite logic levels in alternative embodiments. Component circuitry within integrated circuit devices may be implemented using metal oxide semiconductor (MOS) technology, bipolar technology or any other technology in which logical and analog circuits may be implemented. With respect to terminology, a signal is said to be "asserted" when the signal is driven to a low or high logic state (or charged to a high logic state or discharged to a low logic state) to indicate a particular condition. Conversely, a signal is said to be "deasserted" to indicate that the signal is driven (or charged or discharged) to a state other than the asserted gate (including a high or low logic state, or the floating state that may occur when the signal driving circuit is transitioned to a high impedance condition, such as an open drain or open collector condition). A signal driving circuit is said to "output" a signal to a signal receiving circuit when the signal driving circuit asserts (or deasserts, if explicitly stated or indicated by context) the signal on a signal line coupled between the signal driving and signal receiving circuits. A signal line is said to be "activated" when a signal is asserted on the signal line, and "deactivated" when the signal is deasserted. The term "coupled" is used herein to express a direct connection as well as a connection through one or more intervening circuits or structures. Integrated circuit device "programming" may include, for example and without limitation, loading a control value into a register or other storage circuit within the device in response to a host instruction and thus controlling an operational aspect of the device, establishing a device configuration or controlling an operational aspect of the device through a one-time programming operation (e.g., blowing fuses within a configuration circuit during device production), and/or connecting one or more selected pins or other contact structures of the device to reference voltage lines (also referred to as strapping) to establish a particular device configuration or operation aspect of the device. The term "exemplary" is used to express an example, not a preference or requirement.

While the invention has been described with reference to specific embodiments thereof, it will be evident that various modifications and changes may be made thereto without departing from the broader spirit and scope of the invention. For example, features or aspects of any of the embodiments may be applied, at least where practicable, in combination with any other of the embodiments or in place of counterpart features or aspects thereof. Accordingly, the specification and drawings are to be regarded in an illustrative rather than a restrictive sense.

What is claimed is:

1. An integrated circuit device for delivering power to a load, the integrated circuit device comprising:
   a controller circuit configured to generate a control signal including duty cycle information;
   a power delivery circuit configured:
      to receive the control signal, and
      to deliver an amount of current to the load based on the duty cycle information; and
   a current estimation circuit configured:
      to receive the control signal, and
      to generate a first current information based, at least in part, on the duty cycle information, the current estimation circuit including:
         a decoder circuit configured to generate a duty value based on the duty cycle information; and
         a logic circuit configured to generate the first current information based, at least in part, on the duty value and a slope measurement.

2. The integrated circuit device of claim 1, wherein the control signal is a digital pulse-width-modulated (DPWM) control signal including the duty cycle information.

3. The integrated circuit device of claim 1, wherein the duty value is half the duty cycle information.

4. The integrated circuit device of claim 1, wherein the logic circuit is further configured to receive an output voltage, and the logic circuit further comprises:
   circuitry configured to generate the slope measurement based on the output voltage.

5. The integrated circuit device of claim 4, wherein the circuitry is further configured to generate the slope measurement based on a load voltage.

6. The integrated circuit device of claim 1 wherein the slope measurement is predetermined.

7. The integrated circuit device of claim 1, further comprising:
   a sample current generator, coupled to the power delivery circuit, configured to generate a sample current based on the amount of current delivered to the load.

8. The integrated circuit device of claim 7, wherein the logic circuit is coupled to the sample current generator, and wherein the logic circuit is configured to generate the first current information based on the sample current.

9. The integrated circuit device of claim 7, further comprising:
   a current measurement circuit, coupled to the sample current generator, configured to generate a second current information based on the sample current; and a multiplexer having a first input configured to receive the first current information and a second input configured to receive the second current information,
wherein the multiplexer is configured to selectively output the first or second current information in response to an enable signal.

10. The integrated circuit device of claim 9, wherein the decoder circuit further comprises:
circuitry configured to assert the enable signal when the duty cycle information is less than a minimum duty cycle.

11. The integrated circuit device of claim 10, wherein the minimum duty cycle corresponds to a settling time of the sample current generator.

12. An integrated circuit device for delivering power to a load, the integrated circuit device comprising:
a controller circuit configured to generate a control signal including duty cycle information;
a power delivery circuit configured:
to receive the control signal, and
to drive an output voltage for delivering an amount of current to the load based on the duty cycle information;
a current estimation circuit configured:
to receive the output voltage, and
to generate a first current information based on the output voltage;
a sample current generator, coupled to the power delivery circuit, configured to generate a sample current based on the amount of current delivered to the load; and
a current measurement circuit, coupled to the sample current generator, configured to generate a second current information based on the sample current,
wherein the current estimation circuit comprises:
a decoder circuit configured to output an enable signal based on the duty cycle information; and
a logic circuit configured to generate and to store a resistance value based on the output voltage and the second current information.

13. The integrated circuit device of claim 12, wherein the control signal is a digital pulse-width-modulated (DPWM) control signal including duty cycle information.

14. The integrated circuit device of claim 12, wherein the logic circuit further comprises:
circuitry configured to generate the first current information based on the output voltage and the stored resistance value.

15. The integrated circuit device of claim 14, wherein the enable signal is provided to the logic circuit to selectively enable the logic circuit to generate either the resistance value or the first current infoi nation depending, respectively, on whether the enable signal is in a first state or a second state.

16. The integrated circuit device of claim 15, wherein the decoder circuit is configured to output the enable signal in the first state when the duty cycle information is less than a minimum duty cycle, and
wherein the decoder circuit is configured to output the enable signal in the second state when the duty cycle information is greater than or equal to the minimum duty cycle.

17. The integrated circuit device of claim 16, wherein the minimum duty cycle corresponds to a settling time of the sample current generator.

18. The integrated circuit device of claim 15, further comprising:
a multiplexer having a first input configured to receive the first current information and a second input configured to receive the second current information,
wherein the multiplexer is configured to selectively output the first or second current information depending on whether the enable signal is in the first state or the second state.

19. The integrated circuit device of claim 18, wherein the multiplexer is configured to output the first current information when the enable signal is in the first state, and
wherein the multiplexer is configured to output the second current information when the enable signal is in the second state.

20. A method of operation within an integrated circuit device, the method comprising:
receiving a control signal including duty cycle information;
delivering an amount of current to a load based on the duty cycle information;
generating a duty value based on the duty cycle information, wherein the duty value is half the duty cycle information,
generating a first current information based on the duty value and a slope measurement; and
receiving a load voltage and an output voltage, wherein the slope measurement is based on the load voltage and the output voltage.

21. The method of claim 20, wherein the generating the first current information further comprises:
performing a linear extrapolation based on the duty cycle information.

22. The method of claim 20, wherein the control signal is a digital pulse-width-modulated (DPWM) control signal.

23. The method of claim 20, further comprising:
generating a sample current based on the amount of current delivered to the load;
generating a second current information based on the sample current; and
selectively outputting the first or the second current information in response to an enable signal.

24. The method of claim 23, further comprising:
asserting the enable signal depending on whether the duty cycle information is less than a minimum duty cycle.

25. The method of claim 24, wherein the minimum duty cycle corresponds to a settling time associated with generating the sample current.

26. The method of claim 23, wherein the generating the first current information comprises:
generating the first current information based on the output voltage and the sample current.

27. A method of operation within an integrated circuit device, the method comprising:
receiving a control signal including duty cycle information;
driving an output voltage to deliver an amount of current to a load based on the duty cycle information;
generating a first current information based on the output voltage;
generating a sample current based on the amount of current delivered to the load;
generating a second current information based on the sample current; and
selectively outputting the first current information or the second current information based on whether the duty cycle information is less than a minimum duty cycle.

28. The method of claim 27, wherein the minimum duty cycle corresponds to a settling time associated with generating the sample current.

29. The method of claim 27, wherein the control signal is a digital pulse-width-modulated (DPWM) control signal.

30. The method of claim 27, further comprising:
generating a resistance value based on the output voltage and the second current information; and
storing the resistance value.

31. The method of claim 30, wherein the generating the first current information comprises:
generating the first current information based on the output voltage and the stored resistance value.

32. The method of claim 31, further comprising:
selectively enabling generation of the resistance value or the first current information based on whether the duty cycle information is less than the minimum duty cycle.

* * * * *

UNITED STATES PATENT AND TRADEMARK OFFICE
CERTIFICATE OF CORRECTION

PATENT NO. : 8,836,306 B2  
APPLICATION NO. : 13/618652  
DATED : September 16, 2014  
INVENTOR(S) : Khanna et al.

Page 1 of 1

It is certified that error appears in the above-identified patent and that said Letters Patent is hereby corrected as shown below:

In the Claims

Column 24, line 52, please replace "claim 1" with --claim 1,--.

Column 25, line 53, please replace "infoi nation" with --information--.

Signed and Sealed this
Twenty-fourth Day of March, 2015

Michelle K. Lee
*Director of the United States Patent and Trademark Office*